United States Patent
Sasaki et al.

(10) Patent No.: US 6,753,997 B2
(45) Date of Patent: Jun. 22, 2004

(54) MAGNETIC FIELD GENERATOR FOR OPTICAL DEVICES UTILIZING MAGNETO-OPTICAL EFFECT

(75) Inventors: Seimi Sasaki, Kawasaki (JP); Nobuhiro Fukushima, Kawasaki (JP); Satoshi Tachibana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/342,302

(22) Filed: Jan. 15, 2003

(65) Prior Publication Data

US 2003/0165002 A1 Sep. 4, 2003

(30) Foreign Application Priority Data

Mar. 4, 2002 (JP) ........................................ 2002-057045

(51) Int. Cl.[7] ................................................ G02F 1/09
(52) U.S. Cl. ........................................ 359/280; 359/281
(58) Field of Search ................................. 359/237–239, 359/280–284, 324; 398/68; 385/6

(56) References Cited

U.S. PATENT DOCUMENTS 6,570,699 B2 * 5/2003 Onaka et al. ............... 359/281

OTHER PUBLICATIONS

Japanese Patent Abstract No. 11–119178, dated Apr. 30, 1999.

Japanese Patent Abstract No. 11–219507, dated Aug. 10, 1999.

Japanese Patent Abstract No. 08167112, dated Jun. 25, 1996.

* cited by examiner

*Primary Examiner*—Hung Xuan Dang
*Assistant Examiner*—Joseph Martinez
(74) *Attorney, Agent, or Firm*—Staas & Halsey LLP

(57) ABSTRACT

A small-sized magnetic field generator which is suitable for mass production and provides better output stability. A plurality of coils are formed on a non-magnetic insulating material by depositing at least one layer of conductive film in a spiral pattern. A hollow is made in the center of each coil, so that a plurality of main magnetic cores are arranged on the insulating substrate, with their ends fit into those hollows. By supplying appropriate electrical signals to drive the coils individually, their combined magnetic field can be controlled to have an arbitrary distribution. This combined magnetic field is applied to a magneto-optical target device held on the insulating material.

16 Claims, 17 Drawing Sheets

FIG. 13 *PRIOR ART*

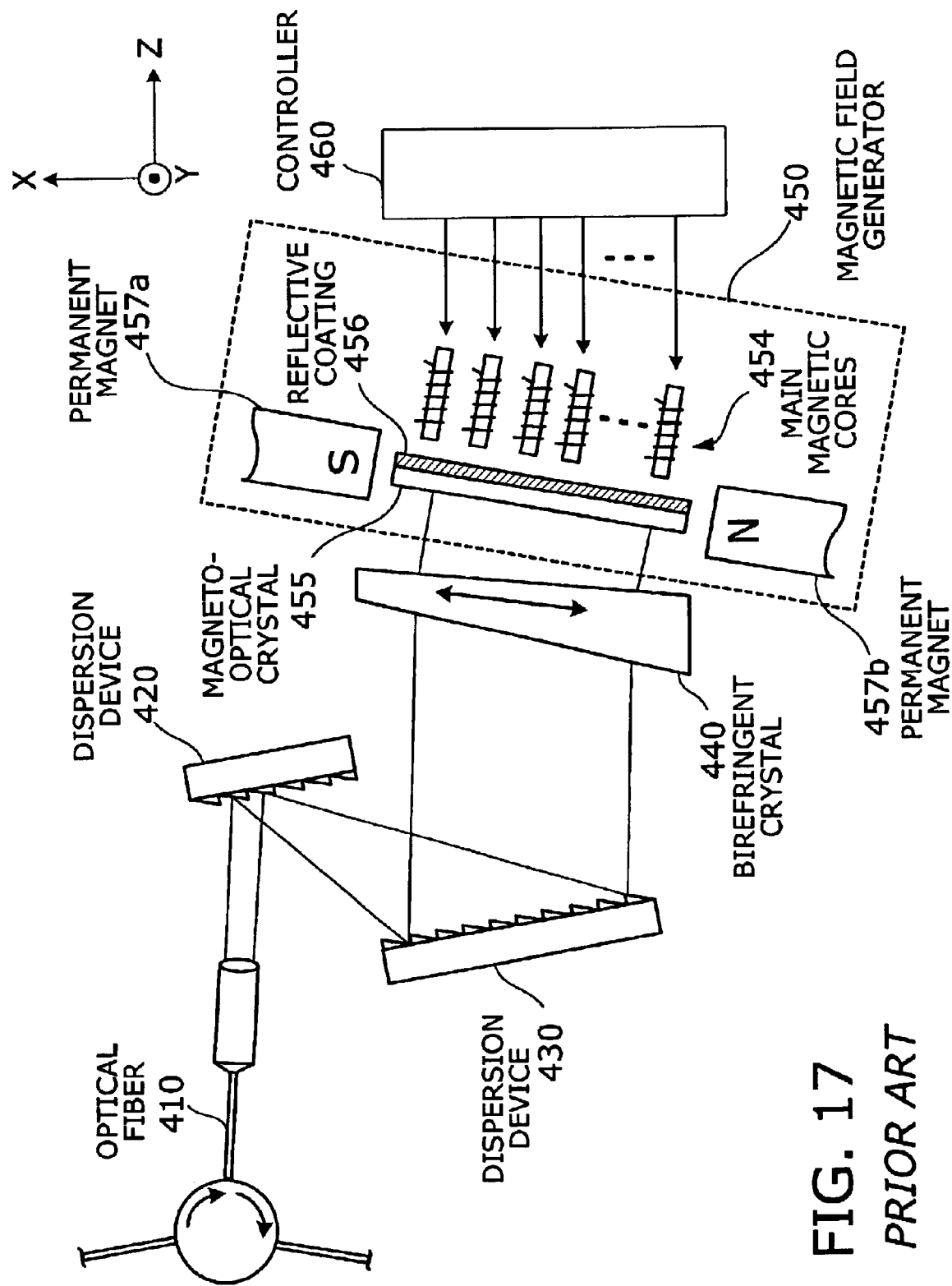
FIG. 17 *PRIOR ART*

US 6,753,997 B2

MAGNETIC FIELD GENERATOR FOR OPTICAL DEVICES UTILIZING MAGNETO-OPTICAL EFFECT

BACKGROUND OF THE INVENTION

1. Field of the Invention

The present invention relates to a magnetic field generator for devices utilizing magneto-optical effect, an optical device and optical attenuator which incorporate such a magnetic field generator, and a method of fabricating a base substrate for the magnetic field generator. More particularly, the present invention relates to a magnetic field generator which applies an arbitrary magnetic field distribution to a magneto-optical crystal, as well as to an optical device and optical attenuator incorporating such a magnetic field generator. It further relates to a method of fabricating a base substrate for that generator.

2. Description of the Related Art

Strenuous efforts have been made these days to develop high-bandwidth, high-speed data communications networks to meet the needs for realtime distribution of large amounts of data, including high-quality images and videos. Particularly, the use of the Internet is continuously expanding, and this situation raises an issue of how to handle the rapidly increasing network traffic. One approach is to increase the number of information-carrying channels that are multiplexed in a fiber optic cable. While there are several ways to achieve this, the wavelength-division multiplexing (WDM) is known as an especially promising technology for high-bandwidth data transport. WDM systems enable us to send multiple optical signals with different wavelengths over a single fiber, and they have actually been deployed in long-haul telecommunications network infrastructures.

In such long-haul optical networks, optical amplifiers should be placed midway to compensate for fiber loss. Some amplifies perform optical-to-electrical conversion to amplify the signal in electrical form, while others boost the intensity of optical signals all optically. The latter type is of greater interest these days because they can be implemented at lower costs than the former type.

The all-optical amplifiers, however, exhibit some non-linear response to different wavelengths. When a plurality of such amplifiers are deployed on an optical path, the spectral distribution of a transmitted optical signal would be seriously distorted when it arrives at the receiving end. Further, increased crosstalk noise is another problem that is caused by the non-linearity of optical amplifiers. It is difficult to receive the information without solving those problems.

The above-described difficulties with conventional optical amplifiers come from their wavelength-dependent gain characteristics. This is called "gain tilt" in optical communications terminology, which is one of the negative factors that limit the maximum transmission distance of a WDM system. In order to reduce the wavelength dependence of amplifier gains, an optical channel equalizer is inserted in the WDM transmission line, which splits a given WDM signal into individual wavelength components (i.e., into individual channels), gives an appropriate attenuation to each channel, and recombines them into a single optical beam for transmission. To this end, conventional systems employ a plurality of optical attenuators. Such systems, however, need as many attenuator modules as the number of WDM channels, which increases the size and complexity of network equipment.

As a solution for the above problem, one of the inventors of the present invention proposed a variable optical attenuator in the Unexamined Japanese Patent Publication No. 11-119178 (1999), which is the basis of the U.S. Pat. No. 5,999,305 granted to the same inventor. The proposed attenuator uses magneto-optical effect to yield a desired attenuation profile for multiple-channel optical signals. More specifically, a magneto-optical crystal is combined with a means for exposing it in a magnetic field with an arbitrary distribution. This single optical device can provide arbitrary attenuation to each individual optical channel.

FIG. 17 shows the concept of the conventional variable optical attenuator mentioned above. A given WDM signal runs through an optical fiber 410 until it reaches two dispersion devices (gratings) 420 and 430, where the light is split into individual wavelength components dispersed in the X-axis direction. The resulting parallel rays of light are incident on a magneto-optical crystal 455 with a reflective coating 456 on its back. The rays are reflected at the reflective coating 456, and the returning light goes back through the same optical path as described above.

The magneto-optical crystal 455 is disposed between permanent magnets 457a (S pole) and 457b (N pole), so that magnetic saturation will be reached in that crystal 455. The magneto-optical crystal 455 is further applied a controlled magnetic field generated from an array of main magnetic cores 454. Here, we can produce any desired magnetic field distribution by commanding a controller 460 to vary electrical current of each individual main magnetic core 454. The magneto-optical crystal 455 serves as a Faraday rotator, which changes the polarization angle of each optical signal component under the influence of the magnetic field being applied. The Faraday rotation angle of a particular wavelength component is determined by the magnetic field strength at a corresponding portion of the magneto-optical crystal 455. A birefringent crystal 440 is placed on the optical path, so that the optical signal will be attenuated in accordance with that Faraday rotation angle. The mechanism of FIG. 17 gives an arbitrary attenuation level to each different wavelength channel in this way.

While the above-mentioned patent application provide almost no details as to the structure of the magnetic field generator 450, there are a couple of other literatures that analogously suggest how to construct it. Although they are originally designed, not for optical attenuators, but for use in a magnetic display device, we are now going to present those two prior-art examples. Both of them are magnetic write heads that apply vertical magnetic fields on a magnetic display medium.

Referring to FIG. 13, a first example of such a conventional magnetic head unit is shown. According to the disclosure in the Unexamined Japanese Patent Publication No. 8-167112 (1996), the body of this unit comprises a flexible circuit board 216 and a housing plate (holding member) 204 made of non-magnetic material. Processed on the housing plate 204 are a plurality of housing cavities 210 each having a side slit 212. The housing cavities 210 accommodate a plurality of discrete coil units, each being composed of a magnetic core 208 made of magnetic material and a coil 206 with terminals 214a and 214b. While FIG. 13 shows them separately, the coil 206 is actually wound around the magnetic core 208.

Every housing cavity 210 has an opening at the front end of the housing plate 204 and a side slit 212 on the top surface of the same. The air-core coils 206 are inserted through the front openings, together with the magnetic cores 208, one for each. The terminals 214a and 214b of each coil 206 are guided out of the housing cavity 210 through the slit 212 and through-holes 217 on the flexible circuit board 216. Finally, they are connected electrically (e.g., by soldering) to some conductors on the flexible circuit board 216, which provides wiring to coil driver circuits (not shown). The coils 206 are energized by individual drive currents that are supplied through the wiring on the flexible circuit board 216, whereby a desired magnetic field is produced in each corresponding magnetic core 208.

Another example of a conventional magnetic head unit is shown in the Unexamined Japanese Patent Publication No. 11-219507 (1999). FIG. 14 depicts the structure of this second example, and FIG. 15 is an enlarged cross-sectional view of part C of FIG. 14. The illustrated magnetic write head has a plurality of very thin coil units 320 that are arranged side by side on a single plane. More specifically, it is constructed with the following components: a flexible circuit board 304, electrically non-conductive substrates 311 and 312, terminals 313, common electrodes 314, individual electrodes 315, and the coil units 320.

An array of the coil units 320 are aligned along one end face 311a of the substrates 311 and 312. Each coil unit 320 has a thin long magnetic layer 323 serving as a core, and surrounding conductive layers 321, 322, 324, and 325 form a coil winding around the magnetic layer 323, spanning its length. Such a coil unit array is sandwiched by two electrically non-conductive substrates 311 and 312. Fabricated on the lower substrate 311 are: the terminals 313, common electrode 314, and individual electrodes 315. All coil units 320 are connected to the common electrodes 314 at their one end, and these common electrodes 314 reach two terminals 313 near the edges of the substrate 311. The remaining ends of the coils are connected to their corresponding individual electrodes 315, and those individual electrodes 315 are wired to the remaining terminals 313 individually. The flexible circuit board 304 is bonded onto the non-conductive substrate 311 in such a way that its printed conductors are in contact with the terminals 313. With the arrangement described above, each coil unit 320 produces a magnetic field H that is substantially perpendicular to the end face 311a of the non-conductive substrate 311.

Referring to FIG. 16, the manufacturing process of the above-described coil units 320 will be described below. The process begins with evaporating copper onto a non-conductive substrate 311. The deposited copper film is then subjected to an etching process to form predefined patterns as shown in part (a) of FIG. 16. This will be a bottom layer 321 of the intended rectangular coil. Although not shown in FIG. 16, the terminals, common electrodes, and individual electrodes are fabricated also at this stage of the process. In the next step, the coil layer 321 is coated with an insulating plastic material by using a screen printing technique. The resulting lower insulation layer 326 is shown in part (b) of FIG. 16. Subsequently, a magnetic layer 323 is formed with a predetermined mask pattern by evaporating Fe—Ni on the insulation layer 326 as shown in part (c) of FIG. 16. In the step shown in part (d) of FIG. 16, the top and both sides of the magnetic layer 323 are coated with a plastic material by using a screen printing technique, which forms insulation layers 327 to 329. In this way, the magnetic layer 323 is fully covered with insulating material.

The above process is followed by electroless copper plating. Here, copper is deposited on the exposed side edges of the bottom coil layer 321, so that the insulation layers 326 to 329 will be sandwiched by the resulting copper walls as shown in part (e) of FIG. 16. Additional coil layers 324 and 325 have thus been produced as two side walls of the intended rectangular coil. The next step shown in part (f) of FIG. 16 is to evaporate copper on top of the insulation layers 327 to 329 and etch the deposited copper film with an appropriate mask pattern that produces an electrical connection with the two side coil layers 324 and 325. An upper coil layer 322 is formed in this way, meaning the completion of individual coil units 320. Then, every open space between coil units is filled with insulating plastic material as shown in part (g) of FIG. 16, which is referred to as a filling layer 330. After that, an upper non-conductive substrate 312 is placed and fixed on the coil units 320, bringing the magnetic write head to completion.

Recall here that we need a magnetic field generator suitable for use in optical devices such as those discussed in FIG. 17. The magnetic field generator 450 in FIG. 17 is supposed to provide the magneto-optical crystal 455 with an arbitrary distribution of magnetic field, and that distribution has to be continuous in the X-axis direction and uniform in the Y-axis direction at least over the width (swing width) of the light beam incident on the magneto-optical crystal 455. Furthermore, it is a crucial requirement that the magnetic field generator 450 be small in size and low in cost, besides being stable and reliable in operation.

The structure of conventional magnetic head units, however, fail to satisfy the above-noted requirements because of their disadvantages described below. Take the first conventional magnetic head unit discussed in FIG. 13, for example. This unit is constructed as a linear array of discrete coil units arranged in parallel with the slits 212, each coil unit having been separately assembled from a magnetic core 208 and a coil 206. Such discrete coil units are not suitable for mass-production or cost reduction, because it is a labor-intensive task to wind a coil 206 around each magnetic core 208 and soldering each coil's terminals 214a and 214b.

Further, in order to realize a smaller magnetic head unit, it is necessary to shrink the magnetic cores and coils and reduce the pitch between coil units. This will enviably lead to the use of smaller-gauge wire for the coils, reduction of their number of turns, and use of thinner magnetic cores. All those factors make the manufacturing process much more difficult. We would only end up with the problems of insufficient accuracy in machining and assembling, reduced mechanical strength of components, and increased cost. After all, the use of discrete coil components has an inherent limitation when it comes to unit size reduction.

Now think of the second conventional magnetic head unit discussed in FIGS. 14 to 16. Unlike the preceding one, this unit is designed to use thin-film and thick-film technologies to process a magnetic layer 323, insulation layers 326 to 329, coil layers 321, 322, 324, and 325. This approach of using fine fabrication techniques is certainly advantageous in that smaller coil units 320 can be constructed in high accuracy and repeatability. There is one problem, however; the thickness of the magnetic core (magnetic layer 323) is limited by the performance of film forming processes. Actually, the thickness is a few tens of micrometers ($\mu$m) at most. For this reason, the generated magnetic field has a width of several tens $\mu$m in the Y-axis direction, while being sufficiently broad and continuous in the X-axis direction. On the other hand, a light beam from an optical fiber is collimated with a lens, resulting in a parallel light beam, typically of several hundreds of $\mu$m (up to 500 $\mu$m) in width. The magnetic layer must be sufficiently thick to cover this light beam width, but it is very difficult to form such a thick magnetic layer with the film-forming process used in the second conventional unit.

In addition, the above two conventional units have a common deficiency; they lack a closed path of magnetic field. Both units have no extra magnetic objects that may guide the magnetic flux generated by coil units and form a closed magnetic circuit. This means that the generated magnetic field is likely to disperse in different directions. When a plurality of coil units are tightly arranged, a magnetic field emanating from one magnetized core may reach the adjacent coil units via the target device, causing an unwanted cross-talk between closely placed coil units. Besides introducing instability to the operation, the lack of appropriate magnetic paths would make the unit less resilient to external disturbances.

SUMMARY OF THE INVENTION

In view of the foregoing, it is an object of the present invention to provide a magnetic field generator which is small in size, capable to producing optimal magnetic field distribution with reduced interference between adjacent cores, and suitable for mass production.

Another object of the present invention is to provide a method of fabricating a base substrate for the magnetic field generator described above.

Yet another object of the present invention is to provide a variable optical attenuator which takes advantage of the magnetic field generator described above.

Still another object of the present invention is to provide an optical device which takes advantage of the magnetic field generator and variable optical attenuator described above.

To accomplish the first object, the present invention provides a magnetic field generator which produces a magnetic field for controlling attenuation of an optical signal. This magnetic field generator comprises the following elements: an insulating substrate made of non-magnetic material, having a plurality of hollows; a plurality of coils formed on the insulating substrate in alignment with the hollows, each having at least one layer of conductive film shaped in a spiral pattern; a plurality of main magnetic cores made of magnetic material, each of which is mounted on the insulating substrate, partly fitting into the hollows; a target device held on the insulating substrate, which is exposed in a combined magnetic field produced by the plurality of main magnetic cores; and a permanent magnet held on the insulating substrate, which applies a magnetic field to the target device so as to bring about magnetic saturation thereof.

In addition, to accomplish the second object, the present invention provides a method of fabricating a base substrate for a magnetic field generator, including coils formed on a silicon substrate and a structure to hold magnetic objects. This method comprises the following steps: (a) forming an insulation film on top and bottom sides of the silicon substrate, and partly removing the bottom-side insulation film to create an opening at a place where a hollow will be made; (b) etching the silicon substrate using the bottom-side insulation film as an etching mask to produce a hollow as deep as the thickness of the silicon substrate, whereby the top-side insulation film remains unetched at the bottom of the produced hollow; (c) forming a conductive thin film in a spiral pattern on the top side of the insulated silicon substrate, stacking an insulating thin film thereon, and partly removing the insulating thin film to create openings for coil terminals, electric contacts, and upper hollows; (d) forming another layer of the conductive thin film in a spiral pattern, stacking another layer of the insulating thin film thereon, and partly removing the insulating thin film to create openings for the coil terminals and upper hollows; and (e) removing the top-side insulation layer remaining in the hollows.

Further, to accomplish the third object, the present invention provides a variable optical attenuator which receives a multiplexed optical signal and outputs the same after attenuating each optical component contained therein. This variable optical attenuator comprises the following element: a lens which turns a given optical signal into a collimated beam; a first dispersion device which causes spectral dispersion of the collimated beam to obtain individual wavelength components thereof; a second dispersion device which renders the individual wavelength components parallel, thereby producing a parallel light beam; a birefringent crystal which causes polarization splitting of the parallel light beam; and a magnetic field generator which applies a magnetic field to the parallel light beam has passed through the birefringent crystal. Here, the magnetic field generator comprises the following elements: an insulating substrate made of non-magnetic material, having a plurality of hollows; a plurality of coils formed on the insulating substrate in alignment with the hollows, each having at least one layer of conductive film shaped in a spiral pattern; a plurality of main magnetic cores made of magnetic material, each of which is mounted on the insulating substrate, partly fitting into the hollows; a target device held on the insulating substrate, which is exposed in a combined magnetic field produced by the plurality of main magnetic cores; and a permanent magnet held on the insulating substrate, which applies a magnetic field to the target device so as to bring about magnetic saturation thereof.

Moreover, to accomplish the fourth object, the present invention provides an optical device which equalizes the intensity of different wavelength components contained in a multiplexed optical signal. This optical device comprises the following elements: (a) an optical fiber cable carrying the multiplexed optical signal; (b) an optical amplifier which amplifies the multiplexed optical signal; (c) an optical coupler which splits a fraction of the multiplexed optical signal that is amplified by the optical amplifier; (d) a multi-channel optical monitor, coupled to the optical coupler, which measures the intensity of each spectral component contained in the fraction of the multiplexed optical signal; (e) a controller, coupled to the multi-channel optical monitor, which produces electrical signals according to the measured intensity of each spectral component; (f) an optical circulator having a first to third ports to route one optical signal from the first port to the second port and another optical signal from the second port to the third port, the first port being coupled to the optical coupler; (g) a variable optical attenuator which gives an attenuation to each spectral component of the multiplexed optical signal received from the second port of the optical circulator, as specified by the electrical signals supplied from the controller, and sends the resulting equalized optical signal back to the second port of the optical circulator. Here, the variable optical attenuator comprises the following element: (g1) a lens which turns a given optical signal into a collimated beam; (g2) a first dispersion device which causes spectral dispersion of the collimated optical signal to obtain individual wavelength components thereof; (g3) a second dispersion device which renders the individual wavelength components parallel, thereby producing a parallel light beam; (g4) a birefringent crystal which causes polarization splitting of the parallel light beam; and (g5) a magnetic field generator which applies a magnetic field to the parallel light beam that has passed through the birefringent crystal. Further, the magnetic field generator comprises the following elements: (g5a) an insulating substrate made of non-magnetic material, having a plurality of hollows; (g5b) a plurality of coils formed on the insulating substrate in alignment with the hollows, each having at least one layer of conductive film shaped in a spiral pattern; (g5c) a plurality of main magnetic cores made of magnetic material, each of which is mounted on the insulating substrate, partly fitting into the hollows; (g5d) a target device held on the insulating substrate, which is exposed in a combined magnetic field produced by the plurality of main magnetic cores; and (g5e) a permanent magnet held on the insulating substrate, which applies a magnetic field to the target device so as to bring about magnetic saturation thereof.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 17 is a conceptual view of a conventional variable optical attenuator.

DESCRIPTION OF THE PREFERRED EMBODIMENTS

Figure 1:
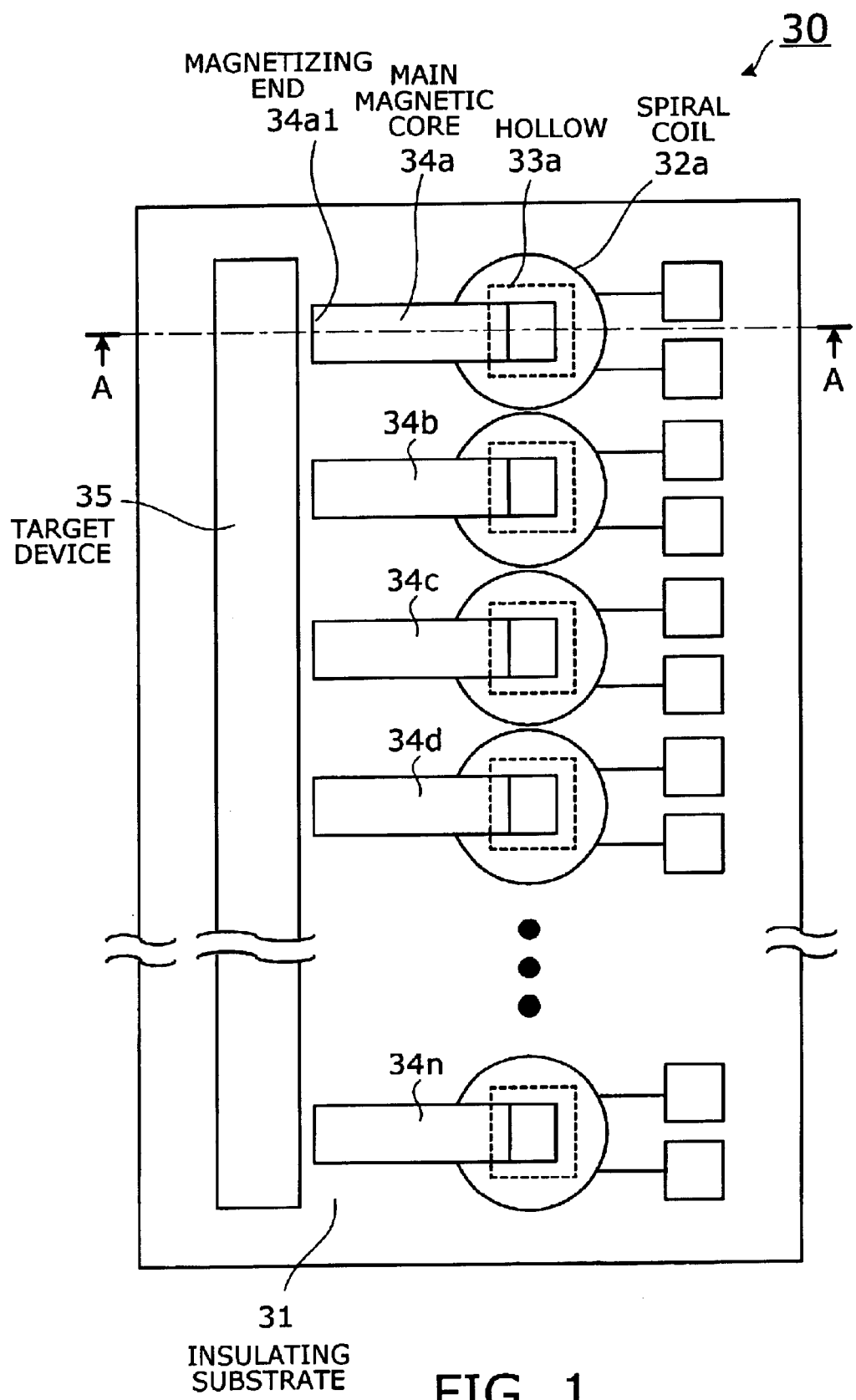
FIG. 1 is a plan view of a magnetic field generator according to a first embodiment of the present invention.

Preferred embodiments of the present invention will be described below with reference to the accompanying drawings, wherein like reference numerals refer to like elements throughout.

Figure 2:
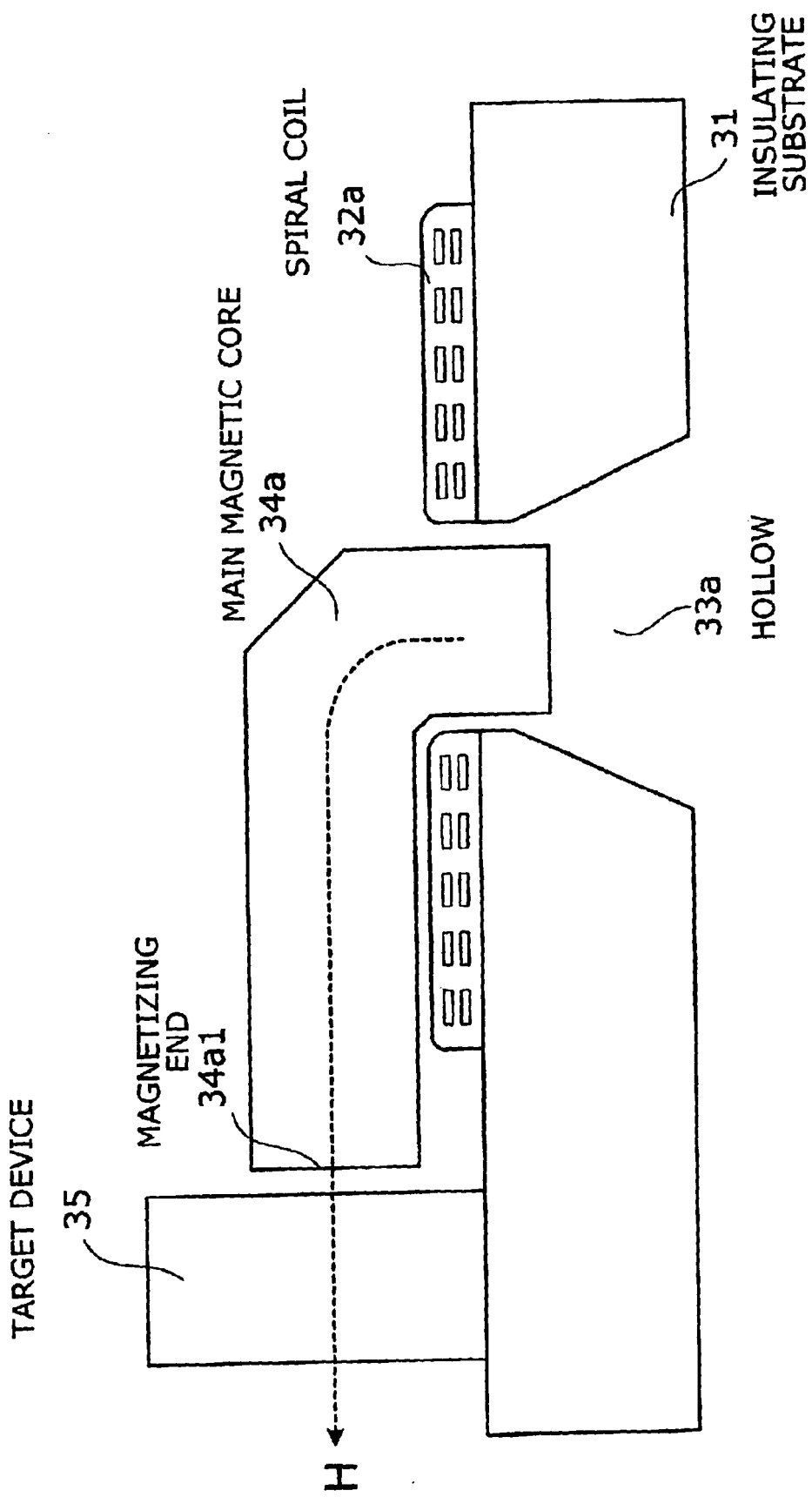
FIG. 2 is a cross-sectional view of part A-A in FIG. 1.

FIG. 1 is a plan view of a magnetic field generator according to a first embodiment of the present invention, and FIG. 2 is a cross-sectional view of part A—A in FIG. 1. As FIG. 1 shows, the proposed magnetic field generator 30 comprises the following components: a non-magnetic base substrate (hereafter "insulating substrate") 31 having hollows 33a; conductive film spiral coils 32a formed on the insulating substrate 31 in alignment with the hollows 33a; main magnetic cores 34a which partly fit into the corresponding hollows 33a; and a target device 35 to be applied a magnetic field from the main magnetic cores 34a. One extreme end of each main magnetic core 34a that faces the target device 35 is referred to as a magnetizing end 34a1, from which magnetic lines of force emanate.

For simplicity purposes, only one set of coil elements are fully labeled in FIG. 1. They are: spiral coil 32a, hollow 33a, main magnetic core 34a, and magnetizing end 34a1. The magnetic field generator 30, however, has multiple instances of similar elements as shown in FIG. 1. We are going to use the reference numeral "34a" to refer to each and any of the main magnetic cores 34a to 34n, as long as there is little likelihood of confusion. This policy also applies to some other reference numerals such as 32a, 33a, and 34a1.

It should also be mentioned that FIG. 1 does not show permanent magnets that apply a static magnetic field to the target device 35. As will be described later in FIG. 11, the proposed magnetic field generator 30 actually has two permanent magnets (or two poles of a single magnet) 36a and 36b as its integral part. Since the function of those magnets 36a and 36b is known in the art, we do not intend to limit their shapes, locations, or arrangements in the present invention. However, more details about their essential function in the present invention will be discussed in a later section, with reference to FIG. 11.

Referring to the magnetic field generator 30 of FIG. 1, the insulating substrate 31 is a base substrate made of non-magnetic material. A plurality of spiral coils 32a are formed on this insulating substrate 31. While FIG. 1 does not show their detailed pattern, each spiral coil 32a has at least one layer of conductive film. The present invention does not limit the shape of such coil patterns, as long as they have inductance to produce a magnetic field with a required strength.

Located in the center of each spiral coil 32a is a hollow 33a, which has the shape of a truncated pyramid. Those hollows 33a are used to hold a part of each main magnetic core 34a. The cross-section of the main magnetic core 34a, at least in its mating portion, is designed to fit into the hollows 33a. As such, the hollows 33a permits the main magnetic cores 34a to be arranged neatly on the insulating substrate 31.

The target device 35 is a magneto-optical object positioned close to the magnetizing end 34a of the aligned main magnetic cores 34a. By applying an electric signal (current) to each spiral coil 32a, a magnetic field H emanates from the end the main magnetic core 34a toward the target device 35. Any kind of semiconductor material (e.g., silicon) is suitable for the insulating substrate 31. In the next section, we are going to describe a method of manufacturing the proposed magnetic field generator 30, assuming the use of a silicon substrate.

Figure 3:
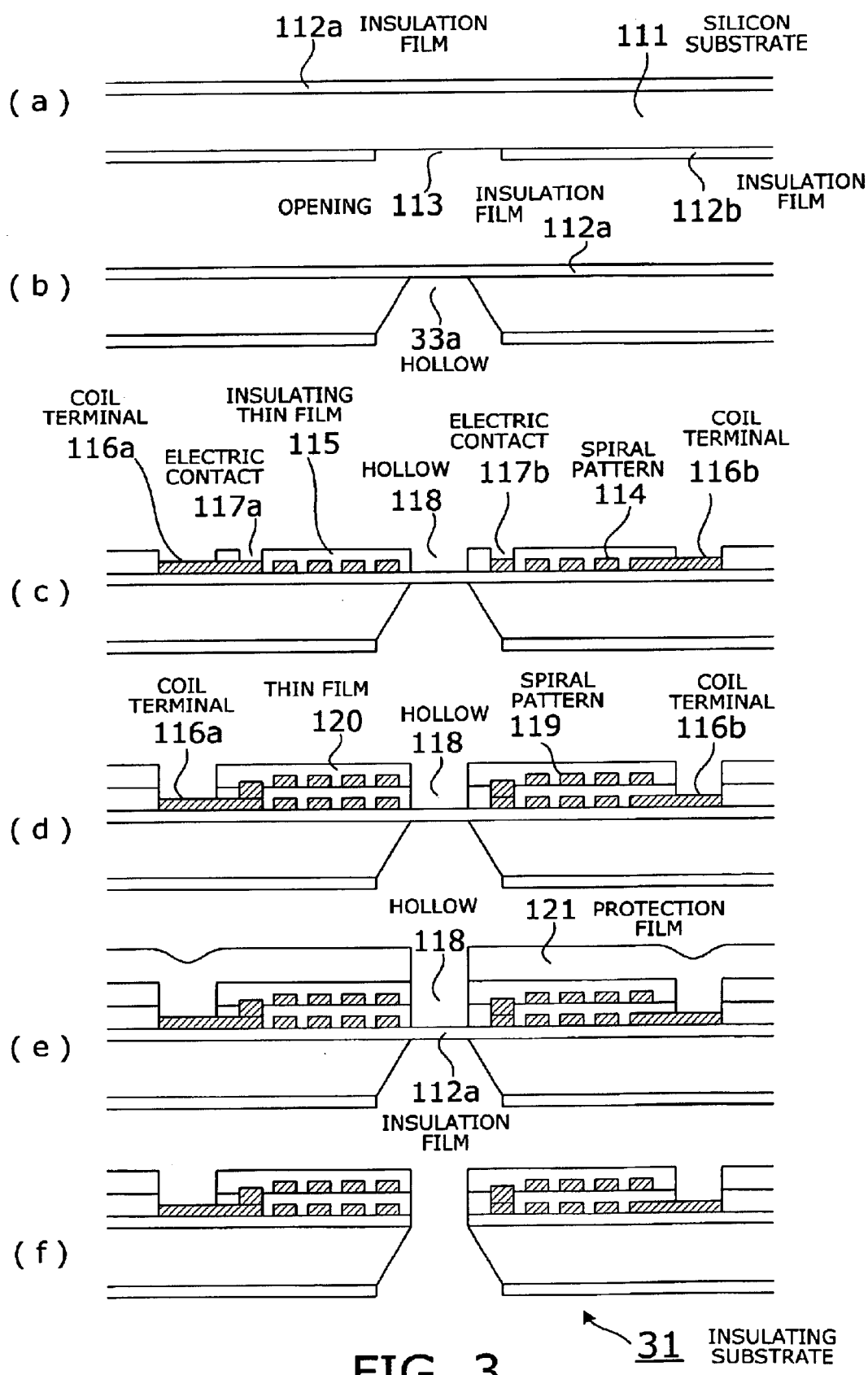
FIG. 3 shows a process of fabricating an insulating substrate made of silicon material.

FIG. 3 shows a process of fabricating an insulating substrate of silicon material. The process begins with forming insulation films 112a and 112b on the top and bottom sides of a silicon substrate 111, respectively. The insulation film 112b on the bottom side is partly removed to create an opening 113 at the place where a hollow will be made, as shown in part (a) of FIG. 3. The silicon substrate 111 is then subjected to an anisotropic etching process to make a hollow 33a from the bottom side as shown in part (b) of FIG. 3. The silicon material exposed at the opening 113 of the insulation film 112b is removed in this etching process, and finally, only the top-side insulation film 112a remains unetched at the bottom of the hollow 33a. At the moment, the hollow 33a may not necessarily be as deep as this; rather, a thin silicon layer is allowed remain unetched (not shown in FIG. 3).

Subsequent to the above, a spiral pattern 114 is formed on the upper side of the silicon substrate 111 by depositing a conductive thin film as shown in part (c) of FIG. 3. An insulating thin film 115 is then stacked on it, part of which is removed to create an opening at each location of coil terminals 116a and 116b, electric contacts 117a and 117b, and a hollow 118. Here, the electric contacts 117a and 117b are used to connect the present spiral pattern 114 with another spiral pattern 119 on an upper layer, which is formed in the next step shown in part (d) of FIG. 3. The second-layer spiral pattern 119, which is the top-most coil winding in the present example, is then covered by a thin film 120 made of insulating material. This thin film 120 is partly removed at the locations of the coil terminals 116a and 116b and hollow 118.

Then a protection film 121 is formed on the top side of the insulating substrate 31 in process, and it is partly taken away to reshape the hollow 118 as shown in part (e) of FIG. 3. Lastly, the remaining insulation film 112a (and remaining silicon material, if any) at the bottom of the hollows 118 and 33a is completely removed by using the opening of the protection film 121 as a mask. As an alternative method to remove them, it would also be possible to use an etching technique such as reactive ion etching (RIE) from the bottom side of the silicon substrate 111. If this is the case, it is not always necessary to form the protection film 121. As the outcome of the above steps, the complete insulating substrate 31 shown in part (f) of FIG. 3 is obtained.

Figure 4:
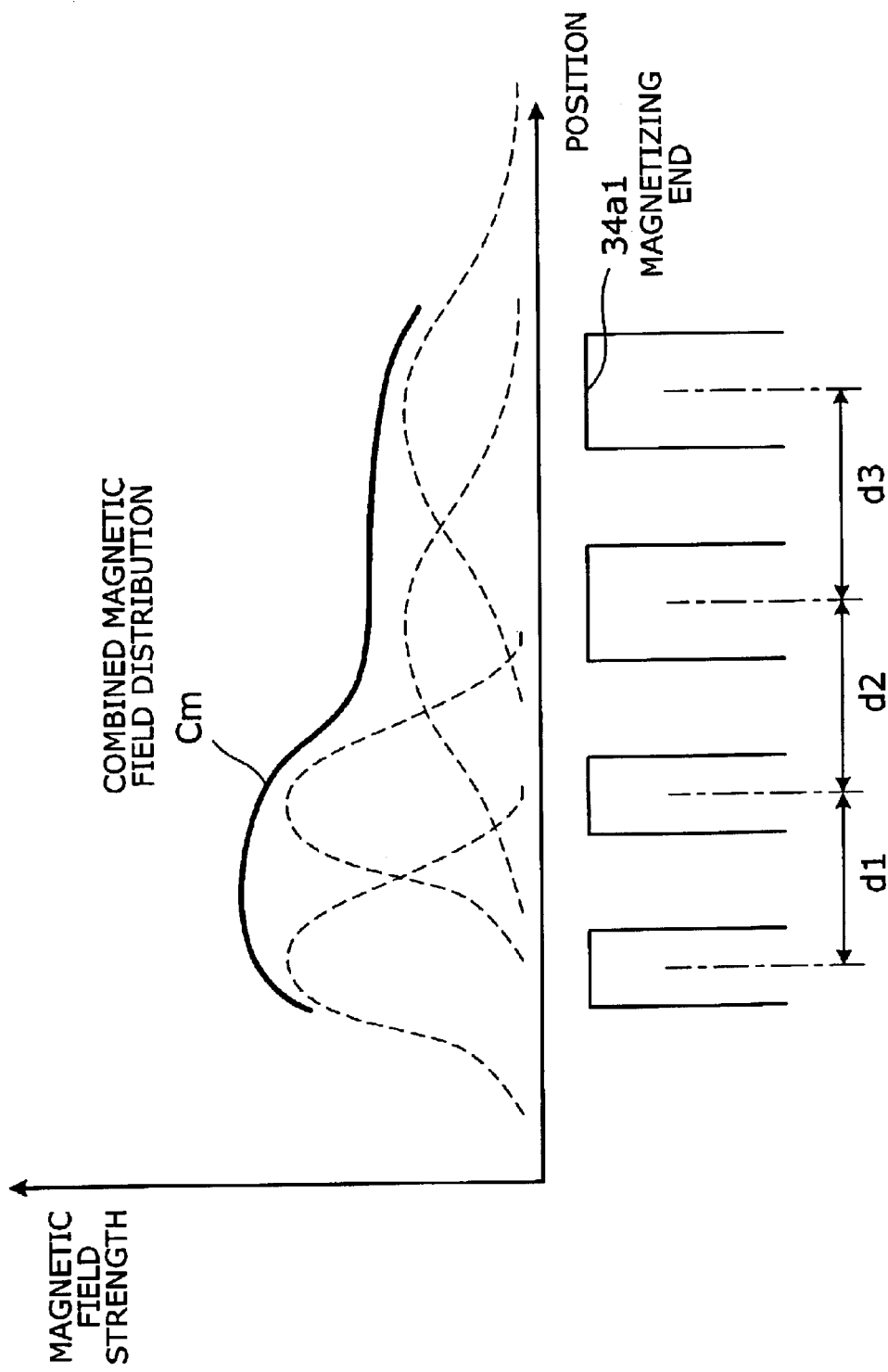
FIG. 4 shows a distribution of a magnetic field generated by the magnetic field generator of the present invention.

FIG. 4 shows a distribution of magnetic field produced by the proposed magnetic field generator 30, where the vertical axis represents the magnetic field strength, and the horizontal axis represents the spatial position along the array of magnetizing ends. As mentioned earlier, we use the reference numeral "34a1" to refer to each and any magnetizing end of the main magnetic cores 34a to 34n, although it was originally assigned to that of the main magnetic core 34a in FIG. 1.

Referring to the graph of FIG. 4, the broken lines indicate the distribution of individual magnetic field emanating from each different magnetizing end 34a1. The width of magnetic field is proportional to the width of the magnetizing end 34a1. When the magnetizing end 34a1 is narrow, the magnetic field strength will be concentrated in its center. When it is wider, the distribution will be more broad and flat. FIG. 4 depicts those two patterns.

By combining different distribution patterns, we obtain the overall distribution of magnetic field, which is referred to herein as the combined magnetic field distribution Cm. That is, the combined magnetic field distribution Cm is calculated as the sum of overlapping magnetic fields produced by a plurality of main magnetic cores.

The individual magnetic field strength varies with the amount of electric current flowing in each coil. Further, the profile of Cm is determined by the width of the magnetizing ends 34a1, as well as by the array pitch, or the distance between magnetic cores. The latter is shown in FIG. 4 as the distances d1, d2, and d3 between four magnetic cores, which may not necessarily be unified (i.e., uneven pitch is allowed). The shape, dimension, and spacing of the magnetizing ends 34a1 are optimized to obtain a desired profile of combined magnetic field distribution Cm as shown in FIG. 4.

The combined magnetic field distribution Cm is applied to the target device 35, causing the incident light signal to interact with the generated magnetic field in the substance having magneto-optical properties. Since the light signal has an uneven spectral distribution, the combined magnetic field distribution Cm shall be controlled according to the actual intensity of each different spectral component. Specifically, a strong magnetic field is given to a strong spectral component.

As we have explained above, the present invention proposes a structure that enables main magnetic cores 34a to fit into hollows 33a formed in the center of each spiral coil 32a on a non-magnetic insulating substrate 31. Now we can place a plurality of main magnetic cores 34a at a desired spatial pitch without using any special assembly techniques, because the proposed structure makes their positioning very easy.

According to the present invention, the main magnetic cores 34a are provided in the form of discrete components while all coils are created together on an insulating substrate through a fine fabrication process (see FIG. 3). This approach eliminates the step of assembling discrete coil units, which is labor-intensive part of conventional processes. The manufacturing process can be much simplified because there is no need to wind a coil around each magnetic core or solder each coil to a base substrate.

Another advantage of using discrete components for the main magnetic cores 34a is that it is easy to give a wider cross-sectional area to their magnetizing end 34a1, which has not been possible in conventional methods. The coils, on the other hand, can be shrunk to fit into a given space, since they are processed with fine fabrication techniques. This approach helps high-density mounting.

The manufacturing process shown in FIG. 3 enables us to produce an insulating substrate 31 with hollows 33a and spiral coils 32a from a silicon substrate 111 without any particular difficulties. That is, the hollows 33a can be processed precisely at the desired locations by using anisotropic etching techniques. Note here that this hollowing process intentionally leaves the upper insulation film 112a (and a fraction of silicon substrate 111) unetched as shown in part (b) of FIG. 3. By doing so, the process preserves the flatness of the upper surface of the silicon substrate 111 so as to make fine patterning possible. The unetched part of the insulation film 112a is removed at the final fabrication step to yield a complete substrate 31. The proposed fabrication method of FIG. 3 is suitable for mass production since all steps are executed in a single continuous process.

The insulating substrate 31 is built on a silicon substrate, which is known as a material with a high thermal conductivity. The heat produced by the spiral coils 32a is effectively dissipated, thus resulting in an improved stability of the magnetic field generated, as well as preventing the coils 32a from being burnt.

Further, the magnetizing ends 34a1 (i.e., the head of each main magnetic core 34a) may be designed to have different dimensions or different distances (e.g., d1, d2, d3 in FIG. 4). By optimizing those geometric parameters, we will be able to obtain a desired combined magnetic field distribution Cm with a smaller number of coils and cores. Such an optimal design minimizes the power consumption of the magnetic field generator 30, while still satisfying requirements of magnetic field distribution.

In the foregoing section, we have described the first embodiment of the present invention. The next sections will present several different embodiments (second to sixth embodiments) with reference to FIGS. 5 to 10.

Second Embodiment

Figure 5:
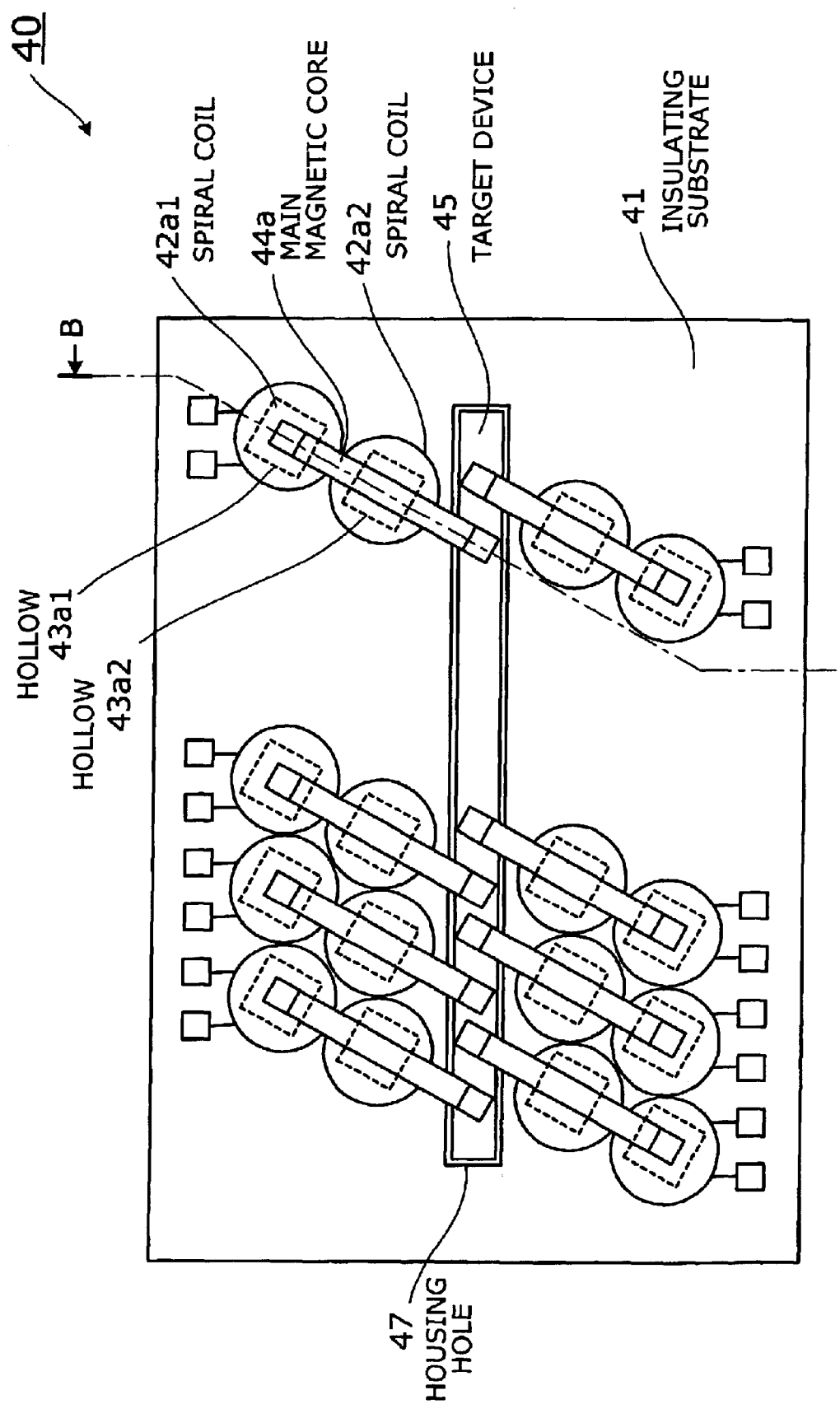
FIG. 5 is a plan view of a magnetic field generator according to a second embodiment of the present invention.
Figure 6:
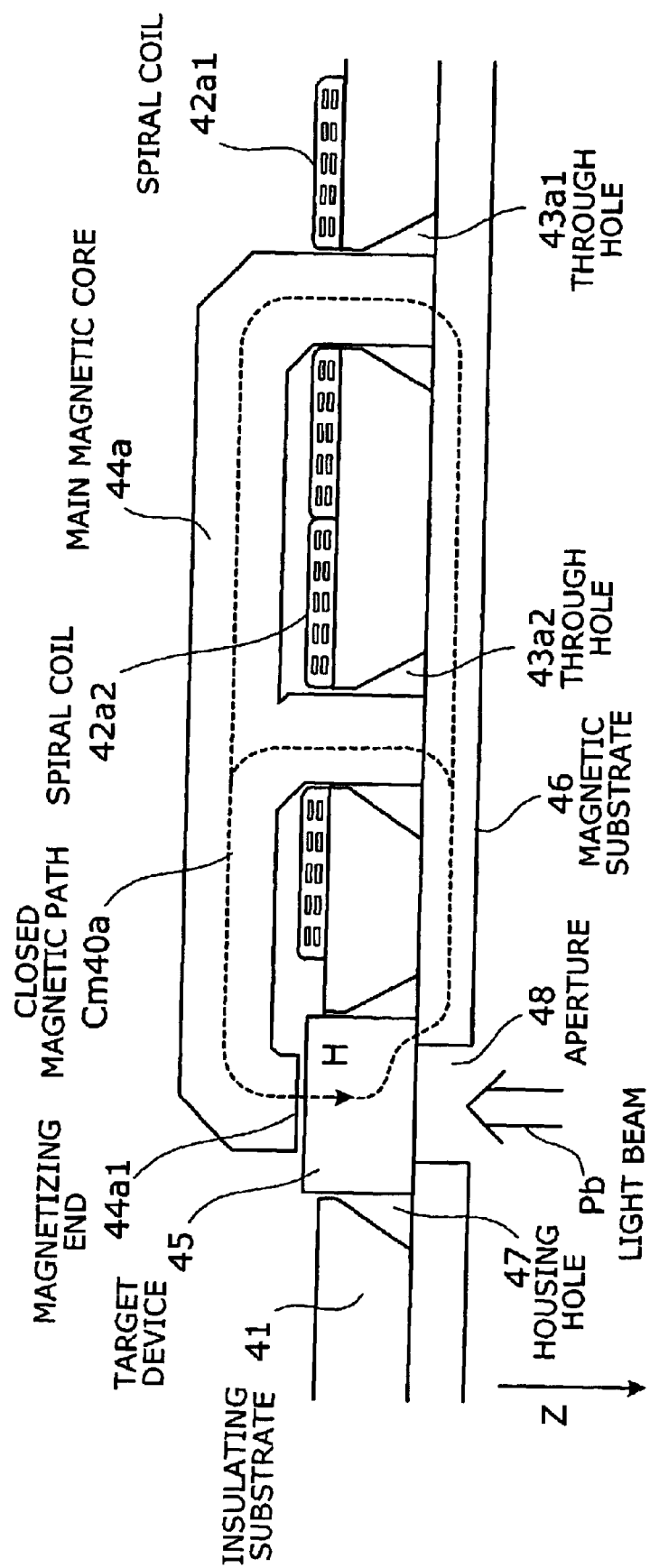
FIG. 6 is a cross-sectional view of part B—B in FIG. 5.

FIG. 5 is a plan view of a magnetic field generator according to a second embodiment of the present invention, and FIG. 6 shows a cross section of part B—B. As seen, this magnetic field generator 40 comprises the following components: a non-magnetic insulating substrate 41 having hollows (hereafter "through holes") 43a1 and 43a2; spiral coils 42a1 and 42a2 which are made of conductive film material and formed on the insulating substrate 41 in alignment with the through holes 43a1 and 43a2; main magnetic cores 44a which are made of magnetic material and partly fit into the through holes 43a1 and 43a2; a target device 45 to be applied a magnetic field from the main magnetic cores 44a; and a magnetic substrate 46 which has magnetic properties at least on its surface and used to support the insulating substrate 41. One extreme end of each main magnetic core 44a that faces the target device 45 is referred to as a magnetizing end 44a1, from which magnetic lines of force emanate. The insulating substrate 41 has a housing hole 47 in its central part to accommodate the target device 45. Further, the magnetic substrate 46 has an aperture 48 to allow a light beam Pb to come in and go out.

While FIG. 5 shows only one set of reference numerals (i.e., spiral coil 42a1 and 42a2, through holes 43a1 and 43a2, main magnetic core 44a, and magnetizing end 44a1), the proposed magnetic field generator 40 actually has multiple sets of such components. The following description will focus on the right-most main magnetic core 44a and its related parts, assuming the analogous nature of other like features. This policy will be valid also in the forthcoming explanation of a third and fourth embodiments and other specific examples of the invention.

Referring to FIG. 6, the magnetic field generator 40 has two spiral coils 42a1 and 42a2 formed on the insulating substrate 41 made of non-magnetic material. While FIG. 5 does not show their detailed pattern, the spiral coils 42a1 and 42a2 have at least one layer of conductive film. Through holes 43a1 and 43a2 are formed in the center of each spiral coil 42a1 and 42a2, into which two legs of the main magnetic core 44a are inserted. The main magnetic core 44a is properly oriented and positioned on the insulating substrate 41.

The insulating substrate 41 is mounted on a magnetic substrate 46 that has magnetic properties at least on its surface. The legs of the main magnetic core 44a are thus in contact with that magnetic surface of the magnetic substrate 46, besides being held inside the through holes 43a1 and 43a2. The housing hole 47 in the center of the insulating substrate 41 is used in conjunction with the magnetic substrate 46 to accommodate the target device 45. Here, the magnetic substrate 46 supports the bottom of the target device 45, partly in contact with it.

The above structure permits the target device 45 to be positioned immediately underneath the magnetizing end 44a1 of the main magnetic core 44a. When a current is supplied to the two spiral coils 42a1 and 42a2, a magnetic field H emanates from the main magnetic core 44a, which goes through the target device 45 and returns to the two legs of the main magnetic core 44a. Note here that the magnetic flux forms the following loop: main magnetic core 44a— target device 45—magnetic surface of magnetic substrate 46—two legs of main magnetic core 44a. FIG. 6 indicates this closed magnetic path Cm40a with the dotted lines. An incoming light beam Pb is directed to the target device 45 through the aperture 48 of the magnetic substrate 46. After being affected by the magnetic field H within the target device 45, the light beam Pb goes back through the same aperture 48.

FIG. 6 shows a specific case where the main magnetic core 44a is magnetically coupled with two spiral coils 42a1 and 42a2, so that their magnetic fluxes will appear together at the magnetizing end 44a1. It is, however, possible to reduce the number of spiral coils to one, or increase it to three or more, while offering other distinct features and arrangement of the second embodiment. When each main magnetic core 44a has a plurality of spiral coils as in FIG. 6, they may be connected electrically in series (not shown). Also, those spiral coils may be arranged on the insulating substrate 41 at a higher density by placing them in a staggered arrangement.

According to the second embodiment, the magnetic field generator 40 has a closed magnetic path Cm40a and applies its magnetic field H to the target device 45 placed in the middle of that path Cm40a. With the proposed structure, the magnetic field produced by each main magnetic core 44a is less likely to disperse in different directions, meaning that unwanted cross-talk interference between adjacent coil units is reduced. This leads to a higher stability of combined magnetic field distribution applied to the target device 45, and in addition, the magnetic field generator 40 becomes more resilient to external disturbances.

As already mentioned above, the second embodiment shows an arrangement where the main magnetic core 44a is magnetically coupled with two spiral coil 42a1 and 42a2 to yield an enhanced magnetic flux at the magnetizing end 44a1. By employing a plurality of spiral coils for each magnetic core in this way, magnetic field can be produced more effectively and efficiently. The theory tells us that the amount of magnetic flux through a coil is proportional to its number of turns. The area that a spiral coil takes up, on the other hand, is proportional to the square of the number of turns. This means, for example, that the foot print of a spiral coil will increase four-fold if we double the number of turns in an attempt to obtain a two times higher magnetic flux level. Such an increase are not acceptable in general, but the second embodiment solves the problem by employing two spiral coils for use with each main magnetic core as shown in FIG. 6, while the number of turns is unchanged. This method enhances the total magnetic flux by the factor of two, but the foot print of the coils is only two-fold, meaning that we can enjoy better space utilization. In other words, the proposed arrangement allows us to reduce the mounting distance between main magnetic cores. When it comes to high-density integration of main magnetic cores, a staggered arrangement of spiral coils will make a great contribution as demonstrated in FIG. 6.

Further, the number of coil terminals can be reduced by fabricating those coils in a series arrangement. This circuit design simplifies a subsequent process of making electric connections (e.g., wire bonding process) between components.

Third Embodiment

Figure 7:
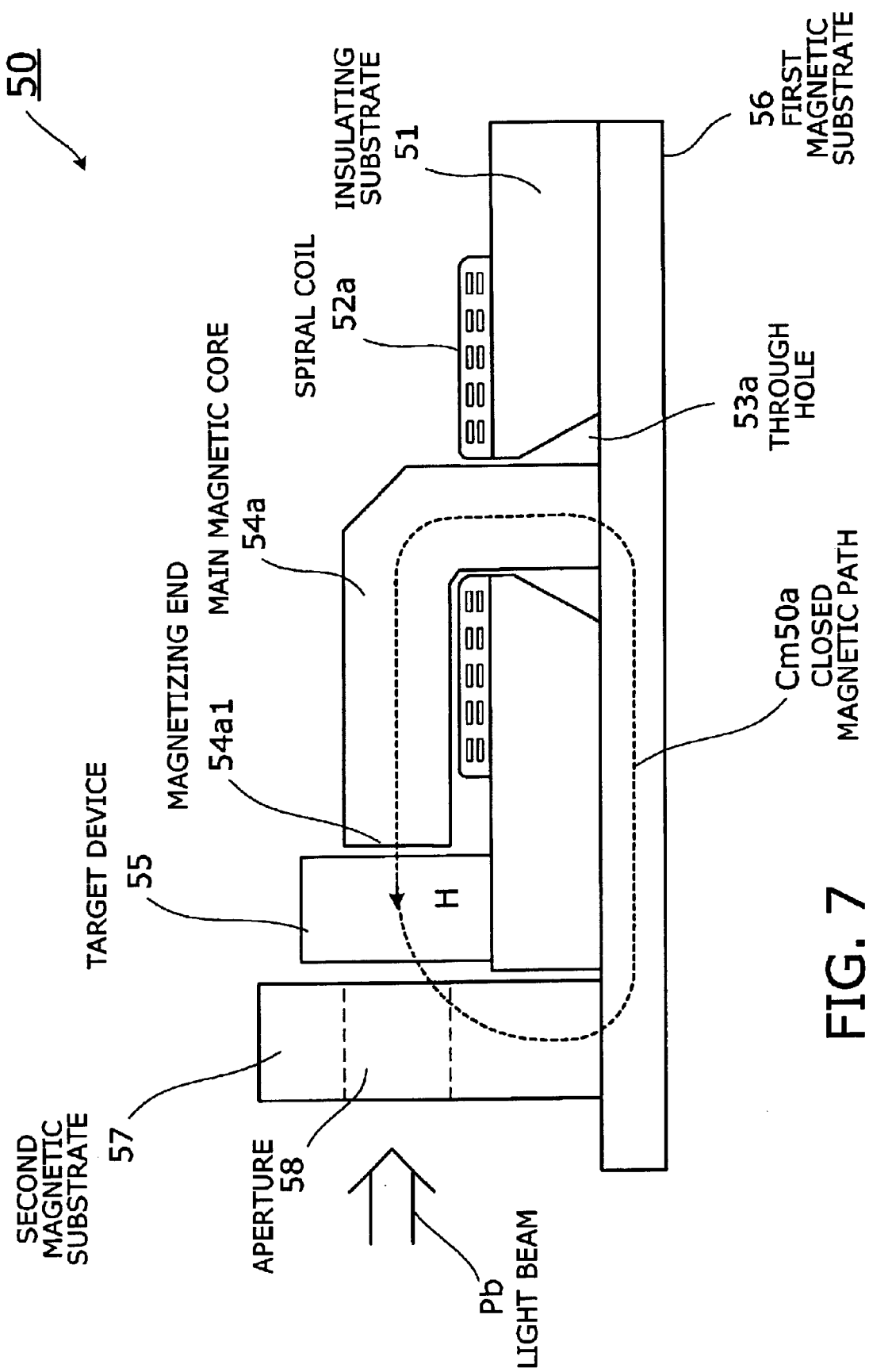
FIG. 7 is a side cross-sectional view of a magnetic field generator according to a third embodiment of the present invention.

FIG. 7 is a side cross-sectional view of a magnetic field generator according to a third embodiment of the present invention. As seen, this magnetic field generator 50 comprises the following components: a non-magnetic insulating substrate 51 having a hollow (hereafter "through holes") 53a; a spiral coil 52a which is made of conductive film material and formed on the insulating substrate 51 in alignment with the through hole 53a; a main magnetic core 54a which is made of magnetic material and partly fits into the through hole 53a; a target device 55 to be applied a magnetic field from the main magnetic core 54a; a first magnetic substrate 56 which has magnetic properties at least on its surface and used to mount the insulating substrate 51 thereon; and a second magnetic substrate 57 which has magnetic properties and is mounted on the first magnetic substrate 56. One extreme end of the main magnetic core 54a that faces the target device 55 is referred to as a magnetizing end 54a1. A magnetic field H emanating from this magnetizing end 54a1 is applied to the target device 55. The second magnetic substrate 57 has an aperture 58 to allow a light beam Pb to come in and go out.

Referring to the magnetic field generator 50 of FIG. 7, the non-magnetic insulating substrate 51 has a spiral coil 52a and through hole 53a with their centers aligned. This insulating substrate 51 is mounted on the first magnetic substrate 56 that has magnetic properties at least on its surface. One end of the main magnetic core 54a is in contact with the magnetic surface of the first magnetic substrate 56, besides being held inside the through hole 53a. The target device 55 is on the insulating substrate 51, positioned close to the magnetizing end 54a1 of the main magnetic core 54a. Located on the opposite side of the target device 55 is a second magnetic substrate 57 made of magnetic material. This second magnetic substrate 57 is mounted on the first magnetic substrate 56, so that it will be in contact with the magnetic surface of the first magnetic substrate 56.

When a current is supplied to the spiral coil 52a, a magnetic field H emanates from one end of the main magnetic core 54a, which goes through the target device 55 and returns to the other end of the main magnetic core 54a. Note here that the magnetic field forms the following circuit: main magnetic core 54a—target device 55—second magnetic substrate 57—magnetic surface of first magnetic substrate 56—main magnetic core 54a. The dotted line in FIG. 6 represents this closed magnetic path Cm50a. With this setup, a light beam Pb hits the target device 55 through the aperture 58 of the second magnetic substrate 57. After being affected by the magnetic field H within the target device 55, the light beam Pb goes back through the same aperture 58.

As described above, the third embodiment provides a closed magnetic path Cm50a, as in the second embodiment discussed in FIG. 6. The third embodiment, however, takes a different arrangement to realize it. That is, a second magnetic substrate 57 is placed beside the target device 55, opposite to the array of main magnetic cores 54a. Since the second magnetic substrate 57 is a magnetic object and has a contact with the magnetic surface of the first magnetic substrate 56, the produced magnetic field H is guided along the resultant closed magnetic path Cm50a. The third embodiment will offer another option to design engineers when they develop an application-specific magnetic field generator.

Fourth Embodiment

Figure 8:
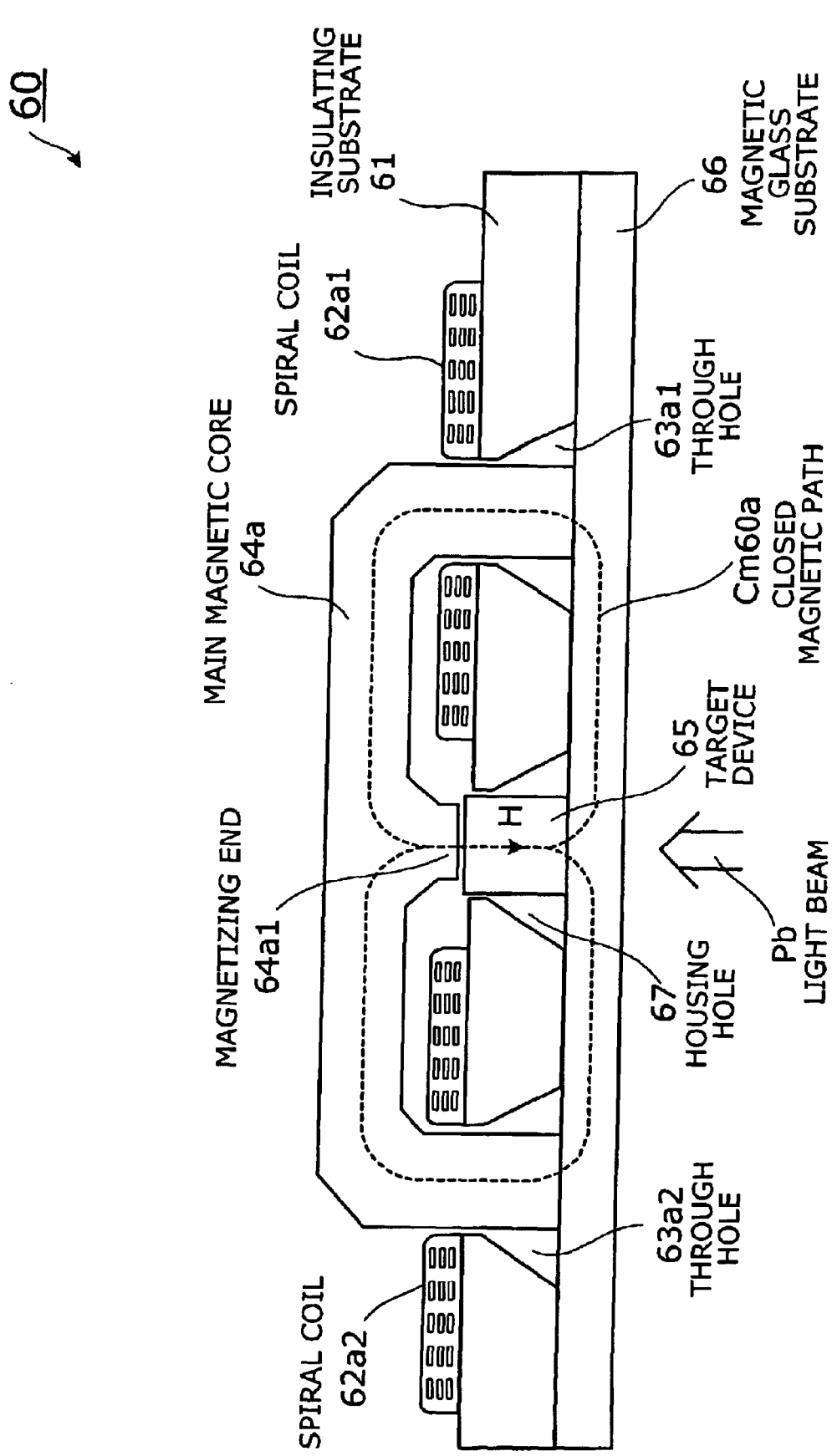
FIG. 8 is a side cross-sectional view of a magnetic field generator according to a fourth embodiment of the present invention.

The above-described second and third embodiments have assumed magnetic properties on at least one surface of the first magnetic substrate. We can use a magnetic glass substrate 66 for this purpose as illustrated in FIG. 8, which is a side cross-sectional view of a magnetic field generator according to a fourth embodiment of the present invention. Most components shown in FIG. 8 provide basically the same functions as those explained in FIG. 6, and therefore, we will focus on the distinct part of the fourth embodiment.

Referring to FIG. 8, the illustrated magnetic field generator 60 has two symmetric closed magnetic paths that meet at a magnetizing end 64a1, in contrast to the asymmetric path Cm40a running through the magnetizing end 44a1 in FIG. 6. Further, the magnetic field generator 60 employs a magnetic glass substrate 66 having magnetic properties on at least its surface, in place of the magnetic substrate 46. In addition, the magnetic glass substrate 66 has no opening, as opposed to the aperture 48 in FIG. 6. Those features distinguish the magnetic field generator 60 from the structure shown in FIG. 6.

The magnetic field generator 60 holds a target device 65 in a housing hole 67 created in its base structure (i.e., the construct of non-magnetic insulating substrate 61 and magnetic glass substrate 66), beneath the magnetizing end 64a1 of the main magnetic core 64a. When a current is supplied to the spiral coils 62a1 and 62a2, a magnetic field H emanates from one end of the main magnetic core 64a and travels along the following loop: main magnetic core 64a—target device 65—magnetic glass substrate 66—main magnetic core 64a. This closed magnetic path Cm60a is symmetric with respect to the central axis of the magnetizing end 64a1. With this setup, a light beam Pb hits the target device 65 through the magnetic glass substrate 66. After being affected by the magnetic field H within the target device 65, the light beam Pb goes back through the same magnetic glass substrate 66. Note here that there is no aperture to pass the light beam Pb because of the transparency of the magnetic glass substrate 66 itself.

As can be seen from FIG. 8 and its explanation, the use of magnetic glass enables us to eliminate the aperture on the bottom-most substrate. This makes the manufacturing process easier since there is no need to pay special attention to the position of the magnetic glass substrate 66 relative to the insulating substrate 61.

Another advantage of this embodiment lies in the shape of its closed magnetic path Cm60a. That is, the magnetic field H from the main magnetic core 64a goes straight into the target device 65 and disperses uniformly over the planar body of the magnetic glass substrate 66. The resulting closed magnetic path Cm60a is smoother than Cm40a in FIG. 6. The target device 65 in is less likely to suffer the problem of uneven magnetic field because of its improved magnetic path Cm60a. For this reason, the proposed structure ensures stable operation of the magnetic field generator 60.

Fifth Embodiment

Figure 9:
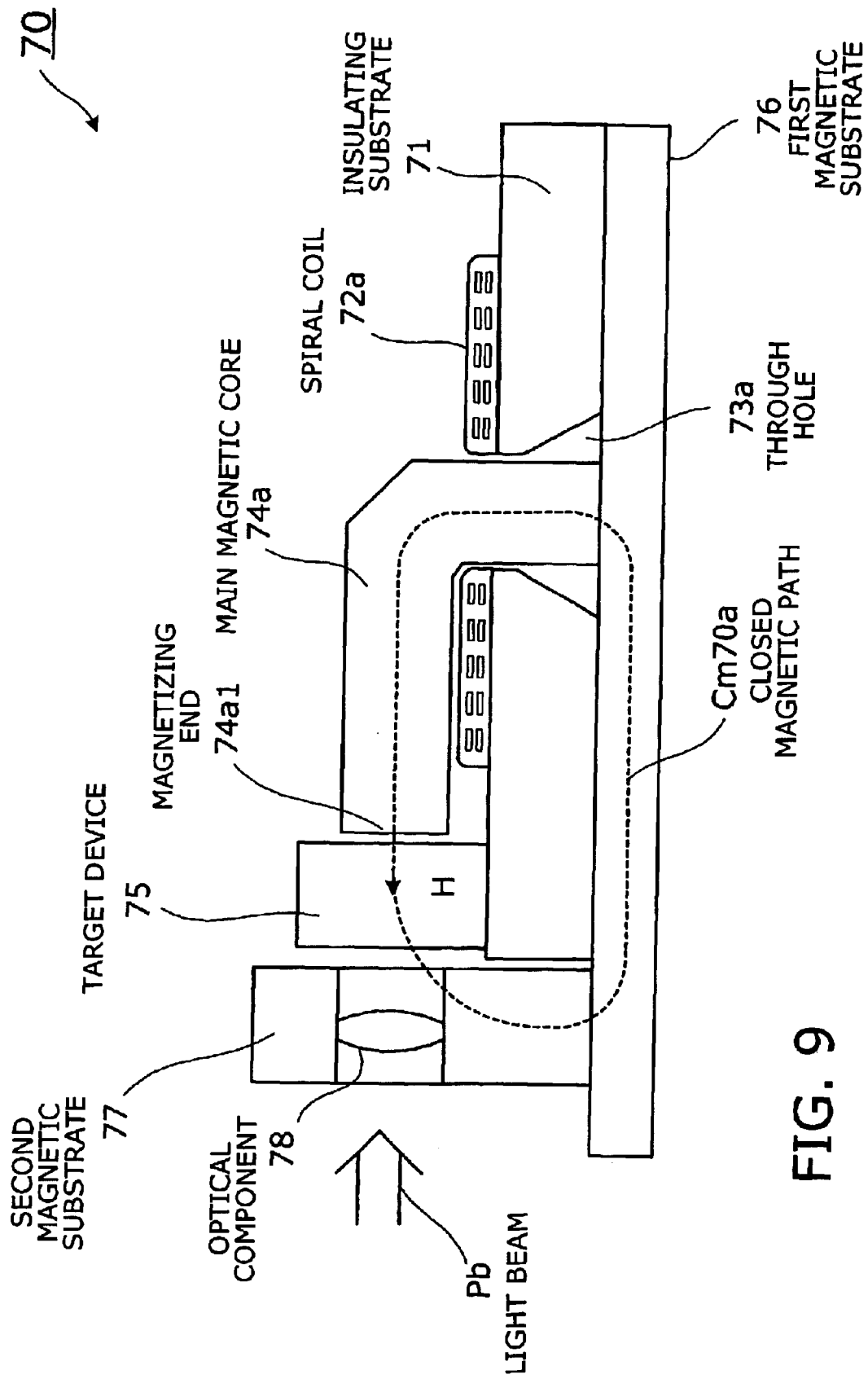
FIG. 9 is a side cross-sectional view of a magnetic field generator according to a fifth embodiment of the present invention.

Here is another embodiment shown in FIG. 9, where a second magnetic substrate 77 serves as part of a magnetic path and also as a holder for an optical component 78. FIG. 9 is a side cross-sectional view of a magnetic field generator according to a fifth embodiment of the present invention. Since most components have basically the same functions as those explained in FIG. 7, we will focus on the distinct part of the fifth embodiment.

Referring to FIG. 9, the illustrated magnetic field generator 70 has an optical component (lens) 78 which is secured in an inner space of a second magnetic substrate 77. This structure, in fact, is obtained by putting a lens 78 in the aperture 58 of the second magnetic substrate 57 in FIG. 7. When a current is supplied to the spiral coil 72a, a magnetic field H emanates from the main magnetic core 74a. It travels through the target device 75 and returns to the main magnetic core 74a, forming the following closed magnetic path Cm70a: main magnetic core 74a—target device 75—second magnetic substrate 77—magnetic surface of first magnetic substrate 76—main magnetic core 74a. With this setup, a light beam Pb is directed to the target device 75 through the optical component 78. After being affected by the magnetic field H within the target device 75, the light beam Pb goes back through the same optical component 78.

Besides providing a magnetic field path, the second magnetic substrate 77 serves as the holder of an optical component 78 that applies some optical control to the incoming light beam Pb. This structure enables us to construct an integrated magnetic field generator which incorporates multiple optical functions with a fewer components.

Sixth Embodiment

Figure 10:
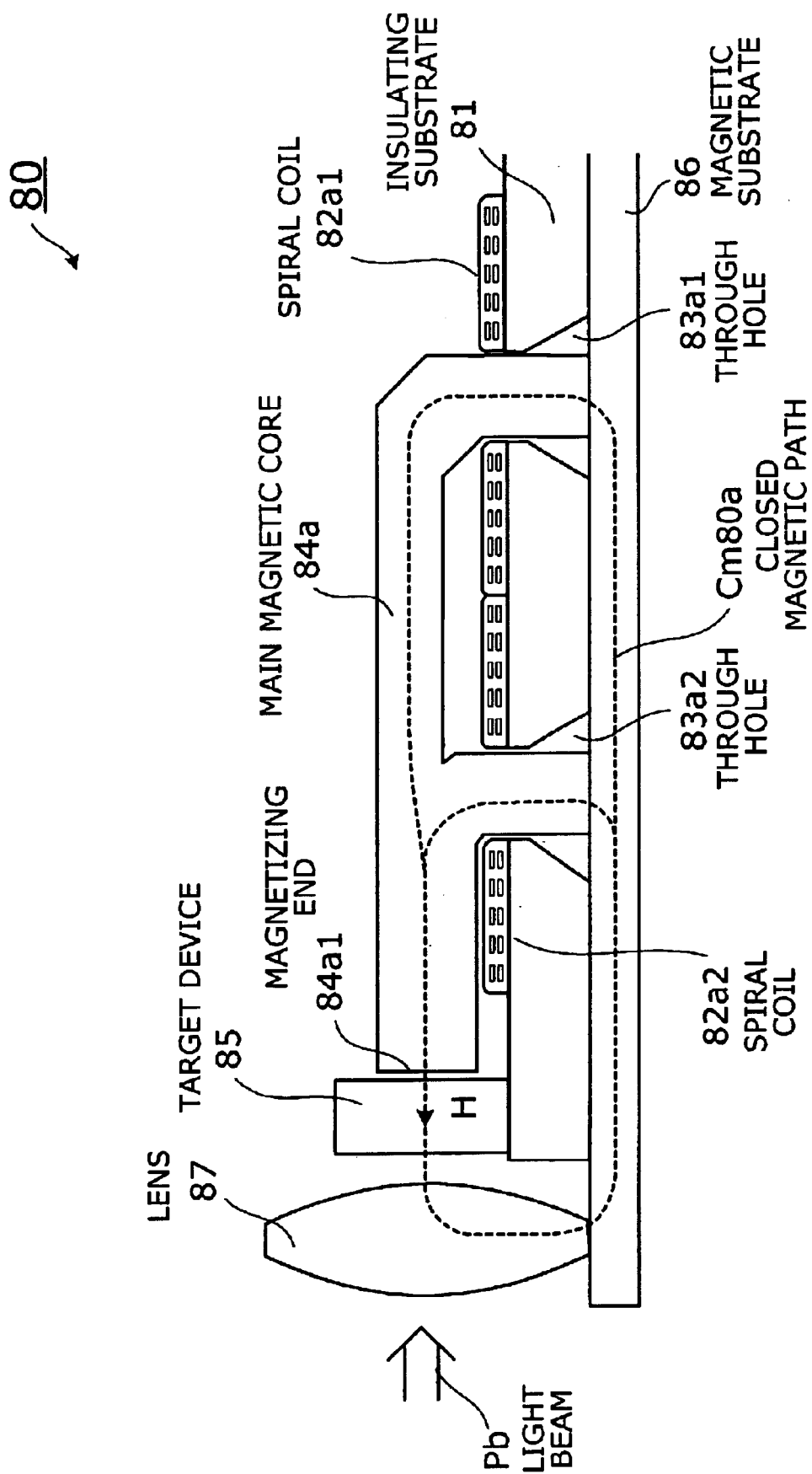
FIG. 10 is a side cross-sectional view of a magnetic field generator according to a sixth embodiment of the present invention.

As a slightly modified version of the magnetic field generator 50 of FIG. 7, the second magnetic substrate 57 may be a magnetic glass lens 87. FIG. 10 is a side cross-sectional view of such a magnetic field generator according to a sixth embodiment of the present invention, in which a magnetic glass lens 87 serves as a second magnetic substrate as well. Since most components shown in FIG. 10 have basically the same functions as those explained in FIG. 7, we will focus on the distinct part of the sixth embodiment.

Referring to FIG. 10, the illustrated magnetic field generator 80 employs a magnetic glass lens 87 in place of the second magnetic substrate 57 in FIG. 7. When a current is supplied to spiral coils 82a1 and 82a2, a magnetic field H emanates from the main magnetic core 84a. It travels through the target device 85 and returns to the main magnetic core 84a, forming the following closed magnetic path Cm80a: main magnetic core 84a—target device 85—magnetic glass lens 87—magnetic surface of magnetic substrate 86—main magnetic core 84a. With this setup, a given light beam Pb is condensed by the lens 87 and then directed to the target device 85. After being affected by the magnetic field H within the target device 85, the light beam Pb goes back through the same path.

The proposed structure enables us to add a function of optical condenser to the magnetic field generator, and besides, it ensures stable operation because of its uniform magnetic field distribution. The magnetic glass lens 87 receives the produced magnetic field H in its entire face. For this reason, the target device 85 in the sixth embodiment is less likely to suffer the problem of unevenness of its internal magnetic field distribution, which leads to more stable operation of the magnetic field generator.

Seventh Embodiment

The above sections have described various magnetic field generators according to the present invention. As for the target devices, however, we have treated them in a generic manner and delivered almost no details. In this section, we will show a specific optical system which incorporates a magneto-optical crystal as the target device where a given light beam Pb is subjected to magneto-optical effect. More specifically, a magneto-optical device (variable optical attenuator) is shown in FIG. 11 and an optical attenuator using that device is shown in FIG. 12.

Figure 11:
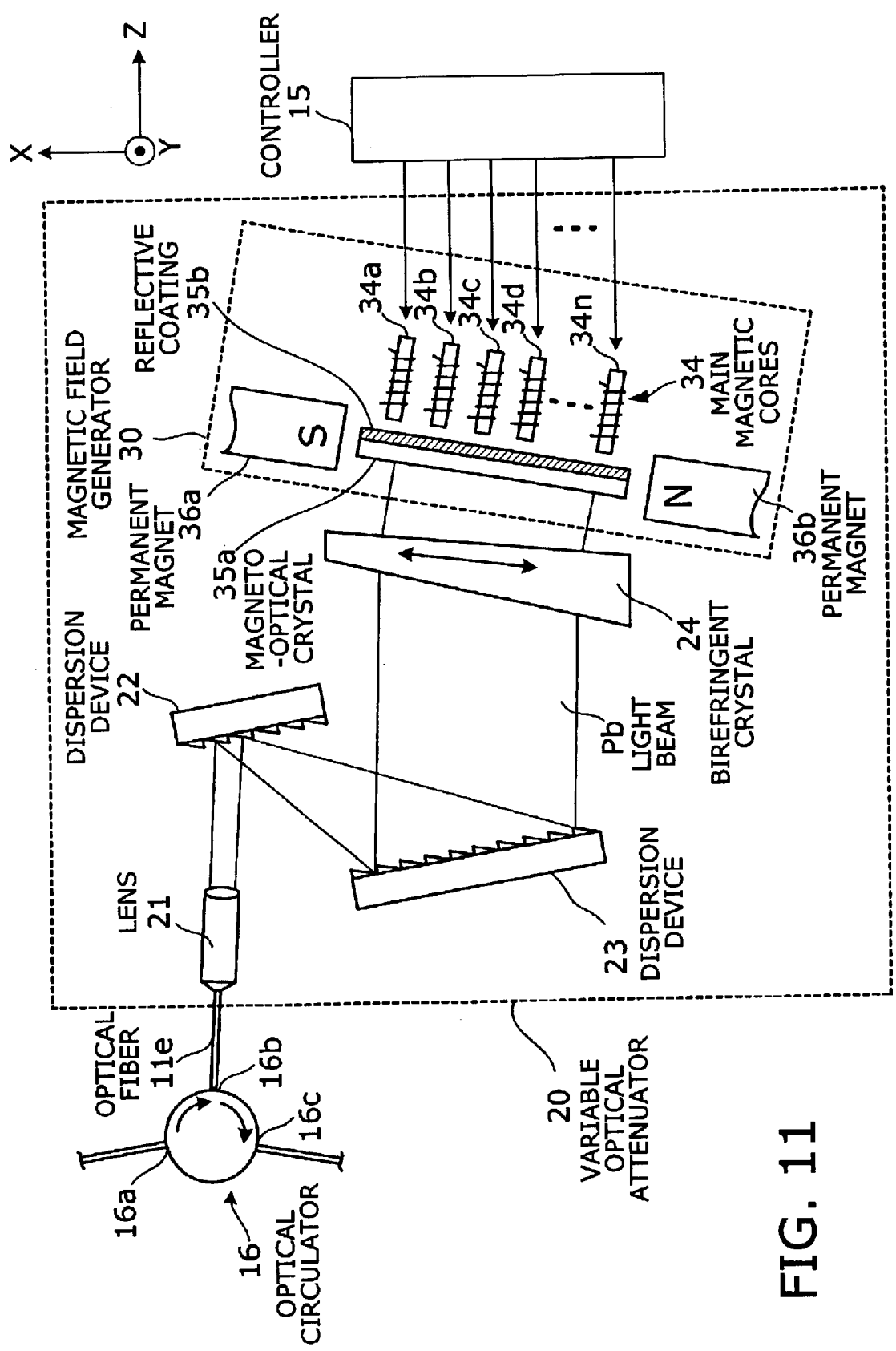
FIG. 11 is a block diagram of a variable optical attenuator according to a seventh embodiment of the present invention.
Figure 12:
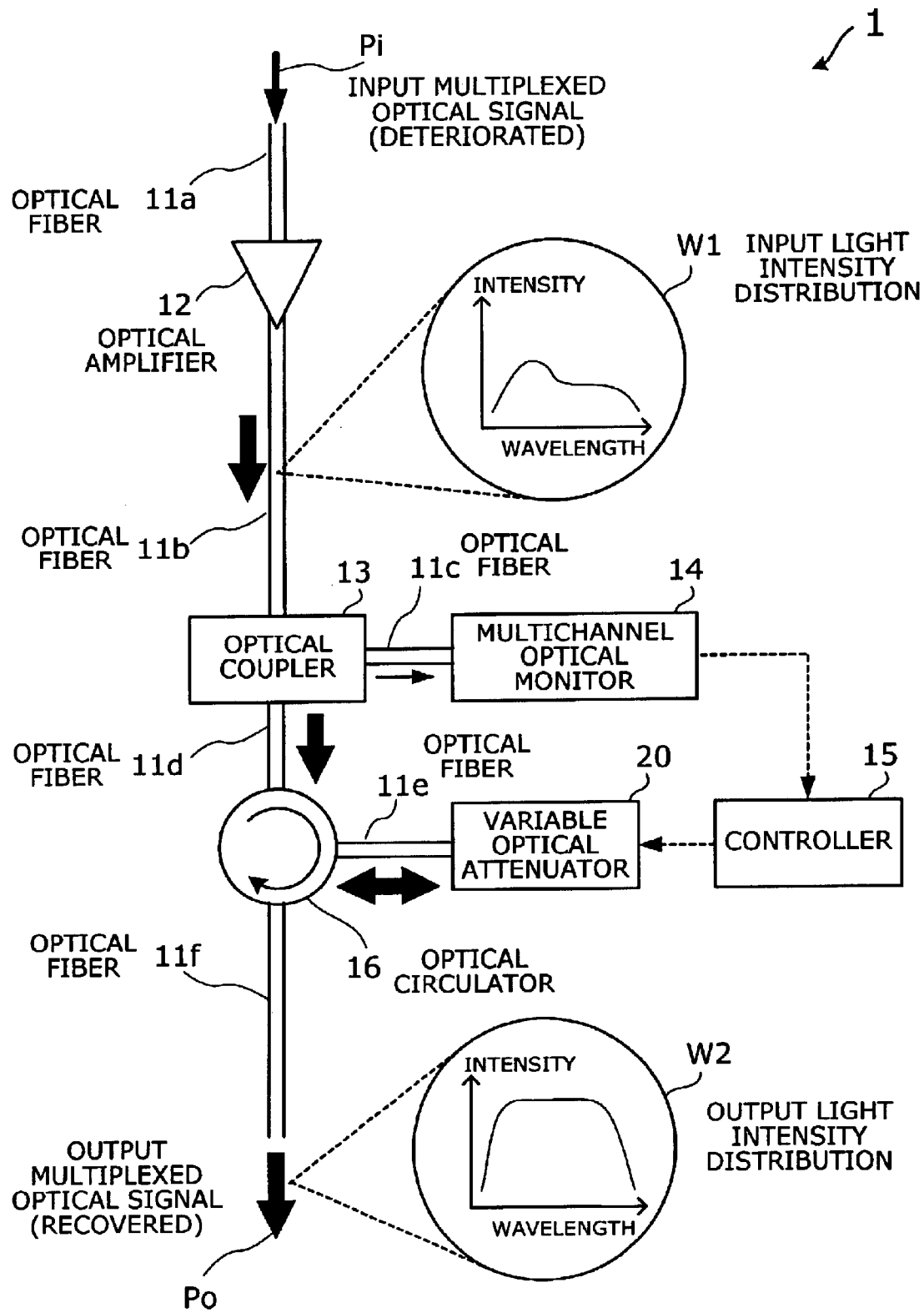
FIG. 12 is a block diagram of an optical device according to the seventh embodiment of the present invention.
Figure 13:
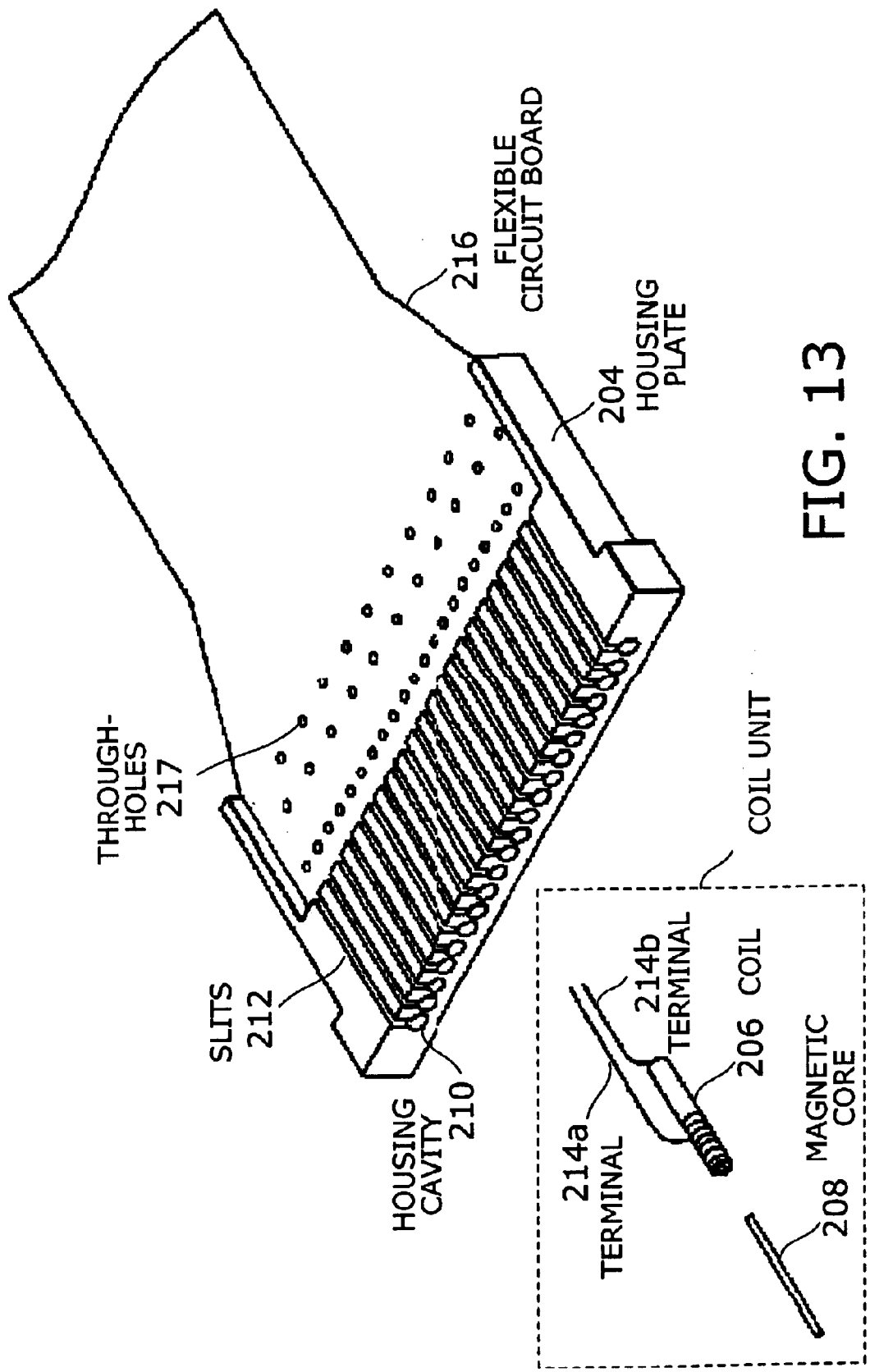
FIG. 13 shows a first example of a conventional magnetic head unit.
Figure 14:
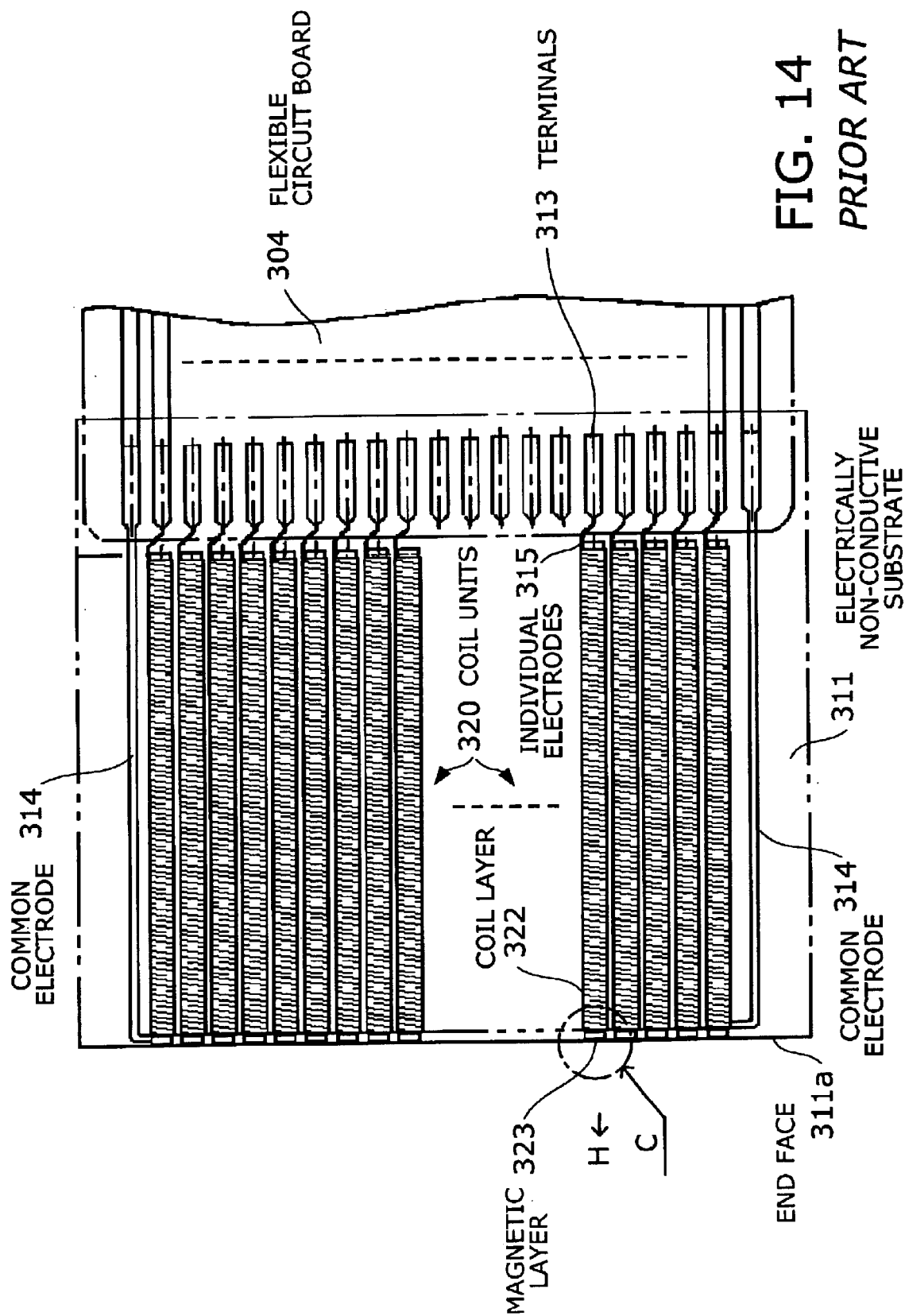
FIG. 14 shows a second example of a conventional magnetic head unit.
Figure 15:
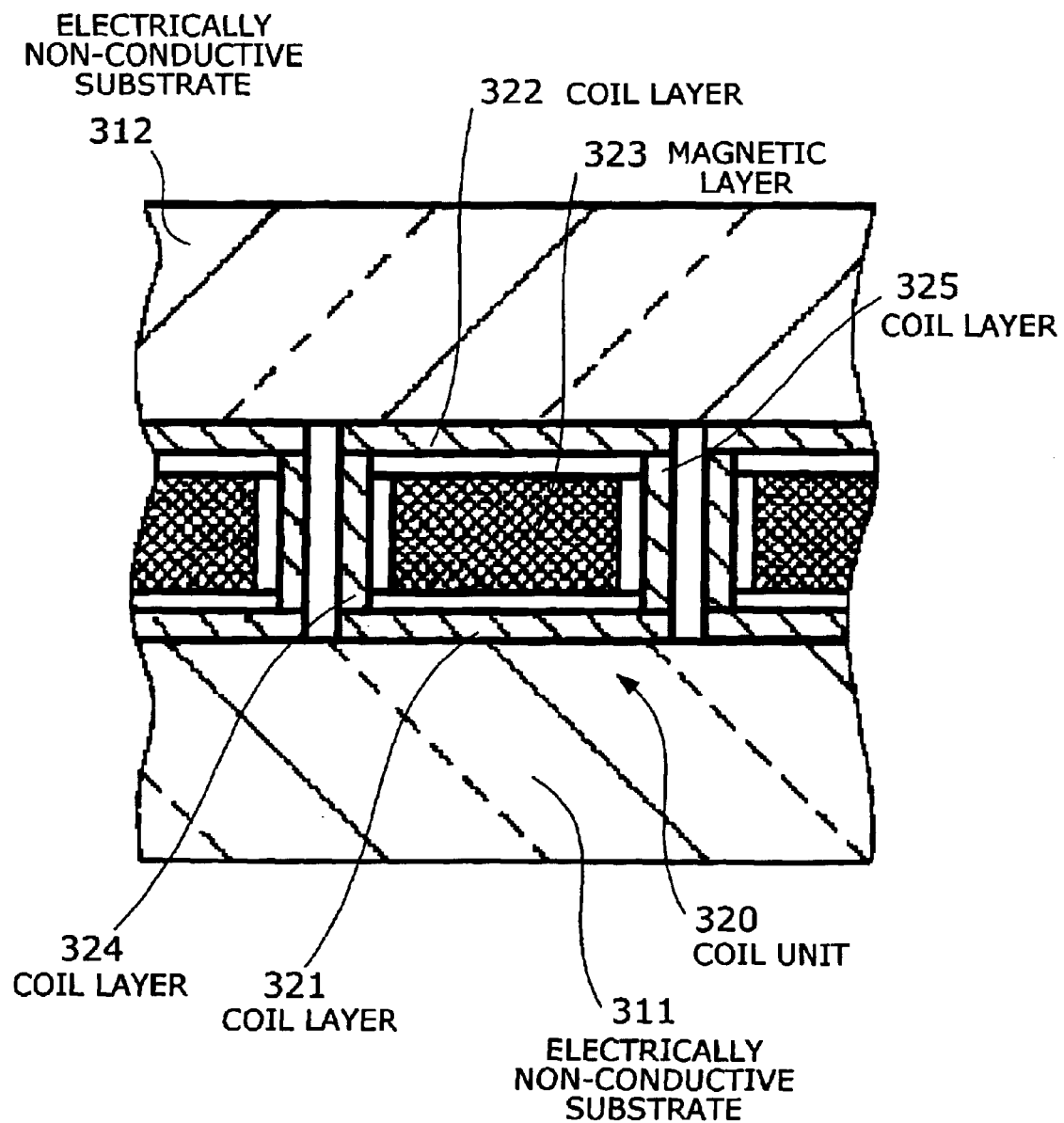
FIG. 15 is an enlarged cross-sectional view of part B in FIG. 14.
Figure 16:
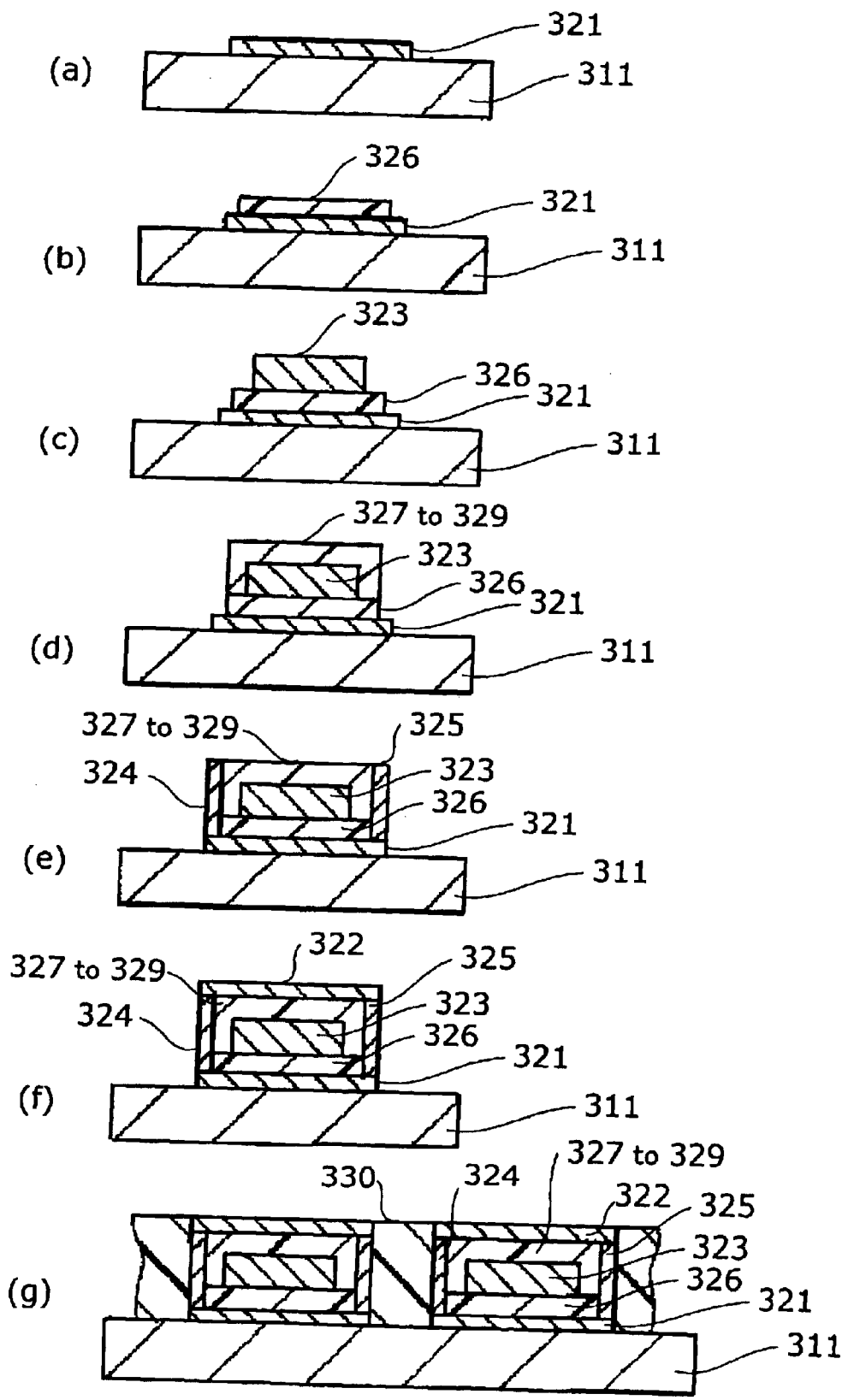
FIG. 16 shows a process of fabricating a coil unit used in the second example.

FIG. 11 is a block diagram of a variable optical attenuator according to the seventh embodiment of the present invention. The illustrated variable optical attenuator 20 comprises the following elements: a lens 21 which turns an incoming multiplexed optical signal into a collimated beam; a first dispersion device 22 which splits the collimated beam into individual wavelength components; a second dispersion device 23 which stops further dispersion of the rays, thereby producing a parallel light beam; a birefringent crystal 24 which causes polarization splitting of the parallel light beam; and a magnetic field generator 30 which applies a magnetic field to the parallel light beam. The magnetic field generator 30 has the following elements: main magnetic cores 34 (including 34a to 34n); a magneto-optical crystal 35a with a reflective coating 35b; and permanent magnets 36a and 36b. The variable optical attenuator 20 is coupled to a three-port optical circulator 16, whose second port 16b is used to exchange optical signals with the variable optical attenuator 20. The variable optical attenuator 20 is also coupled to a controller 15, which provides the magnetic field generator 30 with electrical signals for controlling the magnetic field strength.

The above variable optical attenuator 20 operates as follows. An incoming multiplexed optical signal is carried over an optical fiber and entered to the first port 16a of the optical circulator 16. This signal comes out of the second port 16b and travels through an optical fiber 11e until it is entered to the lens 21 and reformed into a collimated beam there. The collimated optical beam is then directed to a first dispersion device 22, where its multiple wavelength components are spectrally dispersed in different directions. The second dispersion device 23 stops further dispersion of those wavelength components and renders them parallel. The resulting parallel light beam Pb is directed to the magneto-optical crystal 35a after being polarization-split by the birefringent crystal 24. The magnetic field generator 30 produces a magnetic field toward the magneto-optical crystal 35a, the intensity of which is determined by the electrical signals that the controller 15 supplies. Exposed to such a magnetic field within the magneto-optical crystal 35a, the incident light beam is given a certain amount of Faraday rotation, a rotation of polarization plane as a result of magneto-optical effect.

Here, the magneto-optical crystal 35a is biased by a constant magnetic field produced by the permanent magnets 36a (S pole) and 36b (N pole), which brings about magnetic saturation within the magneto-optical crystal 35a. Under this condition, the main magnetic cores 34 apply an additional magnetic field in the direction perpendicular to the bias field, thus varying the direction and magnitude of magnetism in the magneto-optical crystal 35a in any desired way. Since the magnetic field strength of each main magnetic core 34 is variable, a different wavelength component of the incident light may be given a different amount of polarization plane rotation, which will result in an intended amount of optical attenuation of that component when it goes back through the birefringent crystal 24 after being reflected at the reflective coating 35b. This means that each spectral component of the output light beam has been attenuated according to the amount of polarization plane rotation. The output light beam goes back along the same path as it entered, until it reaches the second port 16b of the optical circulator 16. The optical circulator 16 then outputs this light beam from its third port 16c.

FIG. 12 is a block diagram of an optical device according to the seventh embodiment of the present invention. As seen, this optical device 1 comprises the following elements: optical fibers 11a to 11f which carry an optical signal from one device to another; an optical amplifier 12 which amplifies a given optical signal; an optical coupler 13 which splits a fraction of a given optical signal; a multi-channel optical monitor 14 which measures the intensity of each channel component of a given optical signal; a controller 15 which produces electrical signals according to the measured intensity values; an optical circulator 16 which routes optical signals from one port to another; and a variable optical attenuator 20 which varies the intensity of each channel component as specified.

The illustrated optical device 1 receives a wavelength-division multiplexed optical signal Pi through the optical fiber 11a. This input signal Pi is deteriorated due to the transmission losses during propagation. The front-end optical amplifier 12 simply boosts its amplitude and sends the amplified signal to the optical coupler 13 over the optical fiber 11b. The spectral distribution at this point is still deformed as shown in the upper graph W1. The optical coupler 13 splits a fraction of the given signal and routes it to the multi-channel optical monitor 14 through the optical fiber 11c, while directing the rest to the optical fiber 11d. The multi-channel optical monitor 14 measures the intensity of each spectral component contained in the given signal, and supplies the measured values to the controller 15.

On the other hand, the optical circulator 16 receives the optical signal that the optical coupler 13 directed to the optical fiber 11d. The signal appears at the second port of the optical circulator 16 and is delivered to the variable optical attenuator 20 over the optical fiber 11e. The variable optical attenuator 20 gives an intended amount of attenuation to each different spectral component, so that all components will have a uniform intensity. The variable optical attenuator 20 sends this equalized optical signal back to the optical fiber 11e.

The equalization is accomplished by the controller 15, which determines how much current to supply to each main magnetic core 34a to 34n to give an appropriate attenuation to each wavelength, so as to yield equal amplitudes for all different spectral components. More specifically, when the multi-channel optical monitor 14 observes a particular channel with a higher intensity, the controller 15 gives a larger coil current to increase the magnetic field strength at a corresponding portion of the magneto-optical crystal 35a, so that a greater Faraday rotation (i.e., a greater attenuation) will happen to that channel. Now the equalized optical signal goes back to the second port of the optical circulator 16 and comes out of the third port. As shown in the lower graph W2 in FIG. 12, the output multiplexed optical signal Po has recovered its original intensity levels and flat spectral distribution. This signal Po is sent out to the optical fiber 11f for long haul transmission.

As described above, we can realize the variable optical attenuator of FIG. 11 and optical device of FIG. 12 by employing a magneto-optical crystal device as a medium in which the Faraday effect takes place in accordance with a given profile of magnetic field strength. The magnetic field generator used here is small, outstanding in performance, and suitable for mass production. These advantages also enable cost and size reduction of optical devices and optical attenuators.

Specific Implementation

Referring back to all the embodiments explained in FIGS. 1 to 11, we will now provide more specific implementations of the present invention.

FIG. 1 shows the magnetic field generator 30 according to the first embodiment, and FIG. 2 presents its cross-section. In this first embodiment, the non-magnetic insulating substrate 31 is made of silicon, which is fabricated according to the process of FIG. 3.

The fabrication process starts with the thermal oxidation that forms a layer of $SiO_2$ on both sides of a silicon substrate 111 as shown in part (a) of FIG. 3. The produced non-magnetic insulation layers will be referred to hereafter as the $SiO_2$ films 112a and 112b. Then the bottom-side $SiO_2$ film 112b is partly removed to create an opening 113 at the place where a hollow will be made in the next step. The removal of $SiO_2$ is accomplished by using, for example, reactive ion etching (RIE) techniques. As an alternative to the above $SiO_2$ layer forming, an $Al_2O_3$ layer may be deposited on each surface of the silicon substrate 111 with a sputtering process or other appropriate coating techniques.

The insulating substrate 31 is then subjected to an anisotropic etching process in potassium hydroxide (KOH) solutions to create a hollow 33a as shown in part (b) of FIG. 3. The top-side $SiO_2$ film 112a is left unetched at the bottom of the hollow 33a. While FIG. 3 does not show it, a thin silicon layer may also remain unetched beneath the top-side $SiO_2$ film 112a. After that, a spiral pattern (planar coil) is deposited on the top surface of the silicon substrate 111 as shown in part (c) of FIG. 3. This pattern consists of three layers of chromium, copper, and chromium (Cr/Cu/Cr), where the Cr layers serve as joining layers. Then, using a sputtering or evaporation process, an insulating material (e.g., $SiO_2$) is deposited over the spiral pattern 114, thus forming an insulating thin film 115. To create an opening at each location of coil terminals 116a and 116b, electric contacts 117a and 117b, and a hollow 118, those parts of the insulating thin film 115 is selectively etched away. Here, the electric contacts 117a and 117b are exposed to connect the present spiral pattern 114 with another spiral pattern 119 on an upper layer.

In the same way as above, the fabrication process forms a second-layer spiral pattern 119 (the top-most coil winding in the present case) and an $SiO_2$ thin film 120 covering it as shown in part (d) of FIG. 3. The $SiO_2$ film 120 is partly etched away to expose the coil terminals 116a and 116b and hollow 118. After that, a protection film 121 (e.g., polyimide film) is coated over the features, which is then partly etched away to reshape the upper hollow 118 as shown in part (e) of FIG. 3. Lastly, the remaining $SiO_2$ film 112a (and remaining silicon material, if any) at the bottom of the hollow 33a is removed by using the opening of the protection film 121 as a mask. This step brings the complete insulating substrate 31 shown in part (f) of FIG. 3.

In the last step of the above process, we can use RIE from the bottom side of the silicon substrate 111 to remove the remaining $SiO_2$ layer in the hollow 33a, and in the case this alternative method is applied, the preceding step of forming a protection film 121 could be skipped.

While the foregoing embodiments use a silicon substrate, we may choose another non-magnetic substance as base material. Preferably, it is a semiconductor material that can be processed with anisotropic etching. Indium phosphide (InP), for example, is a candidate material.

The main magnetic cores 34a are produced through a blanking process with an appropriate punch and die set, where the material may be permalloy (Fe—Ni), for example. The main magnetic cores 34a produced in this way are placed on an insulating substrate 31, with one end portion being fit into a hollow 33a, and fixed to the insulating substrate 31 with some glue, so that their magnetizing ends 34a1 will face a target device 35 with a slight gap. They are magnetized by supplying a current to the spiral coils 32a, the produced magnetic field being applied to the target device 35.

The main magnetic cores 34a may have different end shapes and/or distances from each other. Referring to the example of FIG. 4, two types of main magnetic cores 34a are used to create a combined magnetic field distribution Cm. That is, when a desired distribution Cm is given, it is divided into segments according to the gradient of that curve. In a segment with a greater gradient, narrow cores 34a with a sharp magnetic field profile will be placed at smaller spatial intervals. In a segment with a smaller gradient, wide cores 34a with a broad magnetic field profile will be placed at larger intervals. The combined use of differently sized main magnetic cores enables us to form a desired combined magnetic field distribution Cm efficiently with a minimum number of cores.

FIGS. 5 and 6 show other examples of the proposed magnetic field generator. In those embodiments, an insulating substrate 41 with hollows 43a1 and 43a2 and spiral coils 42a1 and 42a2 is produced from silicon material by using the same fabrication process as described earlier in FIG. 3. It should be noted here that the hollows 43a1 and 43a2 have to be through-holes. When those hollows 43a1 and 43a2 are processed with anisotropic etching, a housing hole 47 for holding a target device 45 is etched in that same process. The insulating substrate 41 fabricated in this way is bonded on a first magnetic substrate 46 made of, for example, Mn—Zn ferrite material. The target device 45 is accommodated inside the housing hole 47, with a part of its bottom surface in contact with the magnetic substrate 46, and with its side surfaces supported by the walls of the housing hole 47. The magnetic substrate 46 has an aperture 48 opened at the place beneath the target device 45, through which a light beam Pb is incident on the bottom of the target device 45.

Each main magnetic core 44a has two legs that extend perpendicular to its principle axis. It is placed on the insulating substrate 41, with the legs fit into the through holes 43a1 and 43a2 so as to be magnetically coupled with two spiral coils 42a1 and 42a2, and with the feet in contact with the magnetic substrate 46. The head of each main magnetic core 44a has a bend that faces the target device 45. Such main magnetic cores 44a are produced by using a blanking process with an appropriate punch and die set. Their material is permalloy (Fe—Ni), for example.

As FIG. 5 shows, the housing hole 47 for the target device 45 runs in the center of the insulating substrate 41, and the hollows for positioning the main magnetic cores 44a are arranged on both sides of the housing hole 47. The main magnetic cores 44a are bonded on the insulating substrate 41, alternately on the opposite sides of the target device 45. Their magnetizing ends 44a1 are thus aligned in line, facing the top surface of the target device 45. The spiral coils 42a1 and 42a2, when supplied with a current, produce a magnetic flux that emerges from the magnetizing end 44a1 toward the target device 45. The resulting combined magnetic field runs along the following closed magnetic path: main magnetic core 44a—target device 45—magnetic substrate 46—main magnetic core 44a.

When each main magnetic core 44a has a plurality of spiral coils as in FIG. 6, they may be connected electrically in series. The arrangement of spiral coils shown in FIG. 6 is only an example, and alternatively, they may be arranged in a plurality of rows, with non-uniform spacing. Such patterns include a staggered, diamond, and honeycomb arrangements.

As described earlier in FIG. 7, the magnetic field generator may be configured in such a way that a second magnetic substrate 57 made of magnetic material is placed beside a target device 55, opposite to the array of main magnetic cores 54a, in contact with a magnetic surface of a first magnetic substrate 56. In this embodiment, both the first magnetic substrate 56 and second magnetic substrate 57 are made of, for example, Mn—Zn ferrite or Ni—Zn ferrite materials. They are bonded together, with good contact between their magnetic surfaces. An aperture 58 is provided in the second magnetic substrate 57 to introduce a light beam Pb to the target device 55. When the spiral coil 52a is energized with a current, a magnetic field H emanates from the main magnetic core 54a toward the target device 55. Here, the magnetic flux follows a closed magnetic path Cm50a as: main magnetic core 54a—target device 55—second magnetic substrate (magnetic object) 57—magnetic surface of first magnetic substrate 56—main magnetic core 54a.

The above first magnetic substrate is supposed to have magnetic properties at least on its surface. As explained earlier in FIG. 8, we can use magnetic glass materials for this purpose. In this embodiment, the magnetic glass substrate 66 is made of glass material containing, for example, terbium oxide. The target device 65 is accommodated inside the housing hole 67, with a part of its bottom surface in contact with the magnetic substrate 66. Its side surfaces are supported by the walls of the housing hole 67. A light beam Pb comes in to, and goes out of, the target device 65 through the magnetic glass substrate 66. The main magnetic core 64a lies over the target device 65, and its two legs are inserted to the hollows 63a1 and 63a2 until they come in contact with the magnetic glass substrate 66. With this setup, the magnetizing end 64a1 faces the top surface of the target device 65. Two spiral coil 62a1 and 62a2 formed on the insulating substrate 61 are configured to have the same polarity, so that the magnetic fluxes emanating from them will both be directed toward the magnetizing end 64a1. Here, the magnetic flux follows a closed magnetic path Cm60a as: main magnetic core 64a—target device 65—magnetic glass substrate 66—main magnetic core 64a.

The proposed magnetic field generator may have a second magnetic substrate with magnetic properties, as described earlier in FIGS. 9 and 10. In one case, shown in FIG. 9, a second magnetic substrate 77 is employed to serve as a lens holder, and an optical component (lens) 78 is placed inside an aperture opened in the second magnetic substrate 77, so that a given light beam Pb will hit the target device 75, being converged by the optical component 78. The optical component 78 is not limited to lenses, although FIG. 9 illustrates a lens as an example. In the embodiment shown in FIG. 9, the generated magnetic field H is applied to the target device 75 placed in the middle of a closed magnetic path Cm70a as: main magnetic core 74a—target device 75—second magnetic substrate 77—magnetic surface of first magnetic substrate 76—main magnetic core 74a.

Another implementation is shown in FIG. 10, where a lens 87 made of a magnetic glass is placed on the first magnetic substrate 86, so that a given light beam Pb will converge to the target device 85. This magnetic glass component, however, is not limited to lenses, in spite of the illustration of FIG. 10. In the embodiment shown in FIG. 10, the generated magnetic field H is applied to the target device 85 placed in the middle of a closed magnetic path Cm80a as: main magnetic core 84a—target device 85—magnetic glass lens 87—magnetic surface of first magnetic substrate 86—main magnetic core 84a.

FIG. 11 shows a specific optical device which incorporates any version of the magnetic field generator described above. Here, the magnetic field generator 30 employs a magneto-optical crystal 35a as the target device, and a reflective coating 35b is formed on one of its surfaces that faces the array of main magnetic cores 34 (34a to 34n). Other optical devices are laid out as shown in FIG. 11, allowing an optical beam to hit the magneto-optical crystal 35a through an aperture or transparent magnetic glass substrate (not shown) of the magnetic field generator 30.

With the above setup, the system of FIG. 11 works as a variable optical attenuator 20 utilizing magneto-optical effect. More specifically, the variable optical attenuator 20 receives a wavelength division multiplexed optical signal through an optical fiber 11e. This signal are spatially dispersed by two dispersion devices (gratings) 22 and 23, and its spectral components are subjected to a birefringent crystal 24 for polarization splitting. The resulting ordinary rays and extraordinary rays are then incident on the magneto-optical crystal 35a, where we can give an arbitrary amount of polarization plane rotation to each individual optical channel by varying the distribution of a combined magnetic field emanating from the main magnetic cores 34 of the magnetic field generator 30. The light beam reflects at the reflective coating 35b and goes back through the magneto-optical crystal 35a to the birefringent crystal 24. During this return travel, a part of each optical channel signal deviates from the main optical path, depending on the polarization plane rotation given in the magneto-optical crystal 35a. After the dispersion devices 22 and 23, the deviated rays cannot reenter the optical fiber 11e, meaning that the output light beam has a lower intensity than the input light beam. Based on this principle, the variable optical attenuator 20 provides a desired attenuation profile for different channels, with the proposed magnetic field generator to produce any magnetic field distribution.

As seen from the above explanation, the present invention uses discrete main magnetic cores with arbitrary dimensions and cross-sectional shapes while fabricating coils on an insulating substrate separately from the cores. This design simplifies the manufacturing process and is thus suitable for mass production of magnetic field generators, besides making their size reduction possible.

In optical attenuator applications, the magnetic field generators are required to producing an arbitrary lengthwise profile of magnetic field strength in one axis direction (X) while maintaining a uniform distribution in another direction (Y). Further, magnetic flux interference between a plurality of main magnetic cores should be minimized. The present invention fulfills these requirements by allowing the main magnetic cores to be spaced at uneven intervals.

Stability and repeatability of produced magnetic field is another requirement for the magnetic field generators. The present invention ensures them by using of silicon material to effectively dissipate the heat from energized magnetic coils, as well as by combining main cores with additional magnetic objects to form a closed magnetic circuit.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A magnetic field generator which produces a magnetic field for controlling attenuation of an optical signal, comprising:
   an insulating substrate made of non-magnetic material, having a plurality of hollows;
   a plurality of coils formed on said insulating substrate in alignment with the hollows, each having at least one layer of conductive film shaped in a spiral pattern;
   a plurality of main magnetic cores made of magnetic material, each of which is mounted on said insulating substrate, partly fitting into the hollows;
   a target device held on said insulating substrate, which is exposed in a combined magnetic field produced by said plurality of main magnetic cores; and
   a permanent magnet held on said insulating substrate, which applies a magnetic field to said target device so as to bring about magnetic saturation thereof.

2. The magnetic field generator according to claim 1, wherein said insulating substrate is a silicon substrate coated with an insulating film.

3. The magnetic field generator according to claim 1, wherein said hollows are in the shape of a truncated pyramid.

4. The magnetic field generator according to claim 1, wherein said main magnetic cores have different end shapes and are arranged at uneven spatial intervals.

5. The magnetic field generator according to claim 1, wherein each main magnetic core is magnetically coupled with at least two of said coils in such a way that magnetic fluxes produced by the two coils will appear with the same polarity at a magnetizing end of said each main magnetic core.

6. The magnetic field generator according to claim 5, wherein said at least two of said coils are wired together on said insulating substrate, with the same polarity of magnetic flux.

7. The magnetic field generator according to claim 1, wherein said plurality of coils are placed on said insulating substrate in a staggered arrangement.

8. The magnetic field generator according to claim 1, further comprising a magnetic substrate which has magnetic properties at least on one surface thereof, wherein:
   said insulating substrate is mounted on the magnetic surface of said magnetic substrate;
   said hollows in the insulating substrate are through holes;
   said main magnetic cores are fit into the through hole, being in contact with the magnetic surface of said magnetic substrate; and
   said target device is placed between said main magnetic cores and the magnetic surface of said magnetic substrate in such a way that a closed magnetic path runs through two opposing surfaces of said target device.

9. The magnetic field generator according to claim 8, wherein said closed magnetic path runs through said main magnetic cores, target device, and magnetic substrate.

10. The magnetic field generator according to claim 1, further comprising a first magnetic substrate which has magnetic properties at least on one surface thereof, and a second magnetic substrate made of magnetic material, wherein:
    said insulating substrate is mounted on the magnetic surface of said first magnetic substrate;
    said hollows in the insulating substrate are through holes;
    said main magnetic cores are fit into the through hole, being in contact with the magnetic surface of said first magnetic substrate;
    said second magnetic substrate is placed in contact with the magnetic surface of said first magnetic substrate to form a closed magnetic path therethrough; and
    said target device is placed between said main magnetic cores and second magnetic substrate.

11. The magnetic field generator according to claim 10, wherein said closed magnetic path runs through said main magnetic cores, target device, second magnetic substrate, and first magnetic substrate.

12. The magnetic field generator according to claim 10, wherein at least either of said first and second magnetic substrates is made of magnetic glass material.

13. The magnetic field generator according to claim 10, further comprising an optical component held by either of said first and second magnetic substrates.

14. The magnetic field generator according to claim 10, wherein at least either of said first and second magnetic substrates is made of magnetic glass material and functions as a lens.

15. A variable optical attenuator which receives a multiplexed optical signal and outputs the same after attenuating each optical component contained therein, comprising:
    a lens which turns a given optical signal into a collimated beam;

a first dispersion device which causes spectral dispersion of the collimated beam to obtain individual wavelength components thereof;

a second dispersion device which renders the individual wavelength components parallel, thereby producing a parallel light beam;

a birefringent crystal which causes polarization splitting of the parallel light beam; and a magnetic field generator which applies a magnetic field to the parallel light beam has passed through said birefringent crystal, comprising:

an insulating substrate made of non-magnetic material, having a plurality of hollows, a plurality of coils formed on said insulating substrate in alignment with the hollows, each having at least one layer of conductive film shaped in a spiral pattern, a plurality of main magnetic cores made of magnetic material, each of which is mounted on said insulating substrate, partly fitting into the hollows, a target device held on said insulating substrate, which is exposed in a combined magnetic field produced by said plurality of main magnetic cores, and a permanent magnet held on said insulating substrate, which applies a magnetic field to said target device so as to bring about magnetic saturation thereof.

16. An optical device which equalizes the intensity of different wavelength components contained in a multiplexed optical signal, comprising:

(a) an optical fiber cable carrying the multiplexed optical signal;

(b) an optical amplifier which amplifies the multiplexed optical signal;

(c) an optical coupler which splits a fraction of the multiplexed optical signal that is amplified by said optical amplifier;

(d) a multi-channel optical monitor, coupled to said optical coupler, which measures the intensity of each spectral component contained in the fraction of the multiplexed optical signal;

(e) a controller, coupled to said multi-channel optical monitor, which produces electrical signals according to the measured intensity of each spectral component;

(f) an optical circulator having a first to third ports to route one optical signal from the first port to the second port and another optical signal from the second port to the third port, the first port being coupled to said optical coupler;

(g) a variable optical attenuator which gives an attenuation to each spectral component of the multiplexed optical signal received from the second port of said optical circulator, as specified by the electrical signals supplied from said controller, and sends the resulting equalized optical signal back to the second port of said optical circulator, and which comprises:

(g1) a lens which turns a given optical signal into a collimated beam, (g2) a first dispersion device which causes spectral dispersion of the collimated beam to obtain individual wavelength components thereof, (g3) a second dispersion device which renders the individual wavelength components parallel, thereby producing a parallel light beam, (g4) a birefringent crystal which causes polarization splitting of the parallel light beam, and (g5) a magnetic field generator which applies a magnetic field to the parallel light beam that has passed through said birefringent crystal, comprising:

(g5a) an insulating substrate made of non-magnetic material, having a plurality of hollows, (g5b) a plurality of coils formed on said insulating substrate in alignment with the hollows, each having at least one layer of conductive film shaped in a spiral pattern, (g5c) a plurality of main magnetic cores made of magnetic material, each of which is mounted on said insulating substrate, partly fitting into the hollows, (g5d) a target device held on said insulating substrate, which is exposed in a combined magnetic field produced by said plurality of main magnetic cores, and (g5e) a permanent magnet held on said insulating substrate, which applies a magnetic field to said target device so as to bring about magnetic saturation thereof.

* * * * *